(12) United States Patent
Bollinger et al.

(10) Patent No.: US 8,578,708 B2
(45) Date of Patent: Nov. 12, 2013

(54) FLUID-FLOW CONTROL IN ENERGY STORAGE AND RECOVERY SYSTEMS

(75) Inventors: Benjamin R. Bollinger, Windsor, VT (US); Lee Doyle, Lebanon, NH (US); Michael Neil Scott, West Labanon, NH (US); Troy O. McBride, Norwich, VT (US); Andrew Shang, Lebanon, NH (US)

(73) Assignee: SustainX, Inc., Seabrook, NH (US)

( * ) Notice: Subject to any disclaimer, the term of this patent is extended or adjusted under 35 U.S.C. 154(b) by 0 days.

(21) Appl. No.: 13/307,163

(22) Filed: Nov. 30, 2011

(65) Prior Publication Data

US 2012/0085086 A1  Apr. 12, 2012

Related U.S. Application Data

(60) Provisional application No. 61/418,086, filed on Nov. 30, 2010.

(51) Int. Cl.
*F01B 11/00* (2006.01)
*F16K 31/12* (2006.01)

(52) U.S. Cl.
USPC ............ 60/398; 60/409; 91/273; 91/275; 91/278

(58) Field of Classification Search
USPC ............ 60/398, 409; 91/273, 275, 287
See application file for complete search history.

(56) References Cited

U.S. PATENT DOCUMENTS

| 114,297 A | 5/1871 | Ivens et al. |
|---|---|---|
| 224,081 A | 2/1880 | Eckart |
| 233,432 A | 10/1880 | Pitchford |
| 1,353,216 A | 9/1920 | Carlson |
| 1,635,524 A | 7/1927 | Aikman |
| 1,681,280 A | 8/1928 | Bruckner |
| 2,025,142 A | 12/1935 | Zahm et al. |
| 2,042,991 A | 6/1936 | Harris, Jr. |
| 2,141,703 A | 12/1938 | Bays |
| 2,280,100 A | 4/1942 | SinQleton |
| 2,280,845 A | 4/1942 | Parker |
| 2,404,660 A | 7/1946 | Rouleau |
| 2,420,098 A | 5/1947 | Rouleau |
| 2,539,862 A | 1/1951 | Rushinq |
| 2,628,564 A | 2/1953 | Jacobs |
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |

(Continued)

FOREIGN PATENT DOCUMENTS

| BE | 898225 | 3/1984 |
|---|---|---|
| BE | 1008885 | 8/1996 |

(Continued)

OTHER PUBLICATIONS

"Hydraulic Transformer Supplies Continous High Pressure," Machine Design, Penton Media, vol. 64, No. 17, (Aug. 1992), 1 page.

(Continued)

*Primary Examiner* — F. Daniel Lopez

(74) *Attorney, Agent, or Firm* — Bingham McCutchen LLP

(57) ABSTRACT

In various embodiments, compressed-gas energy storage and recovery systems feature one or more valves, which may be disposed within end caps of cylinder assemblies in which gas is expanded and/or compressed, for admitting fluid to and/or exhausting fluid from the cylinder assembly.

18 Claims, 15 Drawing Sheets

(56) References Cited

U.S. PATENT DOCUMENTS

| | | |
|---|---|---|
| 3,041,842 A | 7/1962 | Heinecke |
| 3,100,965 A | 8/1963 | Blackburn |
| 3,236,512 A | 2/1966 | Caslav et al. |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | RiQollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Riqollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | HerberQ |
| 3,998,049 A | 12/1976 | McKinley et al. |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,058,979 A | 11/1977 | Germain |
| 4,089,744 A | 5/1978 | Cahn |
| 4,095,118 A | 6/1978 | Ratbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahniq |
| 4,173,431 A | 11/1979 | Smith |
| 4,189,925 A | 2/1980 | Long |
| 4,197,700 A | 4/1980 | Jahniq |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerlinq |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkings |
| 4,498,848 A | 2/1985 | Petrovsky |
| 4,502,284 A | 3/1985 | Chrisoqhilos |
| 4,503,673 A | 3/1985 | Schachle |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |
| 4,710,100 A | 12/1987 | Laing et al. |
| 4,735,552 A | 4/1988 | Watson |
| 4,739,620 A | 4/1988 | Pierce |

(56) References Cited

U.S. PATENT DOCUMENTS

| | | | |
|---|---|---|---|
| 4,760,697 | A | 8/1988 | Heggie |
| 4,761,118 | A | 8/1988 | Zanarini et al. |
| 4,765,142 | A | 8/1988 | Nakhamkin |
| 4,765,143 | A | 8/1988 | Crawford et al. |
| 4,767,938 | A | 8/1988 | Bervig |
| 4,792,700 | A | 12/1988 | Ammons |
| 4,849,648 | A | 7/1989 | Longardner |
| 4,870,816 | A | 10/1989 | Nakhamkin |
| 4,872,307 | A | 10/1989 | Nakhamkin |
| 4,873,828 | A | 10/1989 | Lainq et al. |
| 4,873,831 | A | 10/1989 | Dehne |
| 4,876,992 | A | 10/1989 | Sobotowski |
| 4,877,530 | A | 10/1989 | Moses |
| 4,885,912 | A | 12/1989 | Nakhamkin |
| 4,886,534 | A | 12/1989 | Castan |
| 4,907,495 | A | 3/1990 | Sugahara |
| 4,936,109 | A | 6/1990 | Lonqardner |
| 4,942,736 | A | 7/1990 | Bronicki |
| 4,947,977 | A | 8/1990 | Raymond |
| 4,955,195 | A | 9/1990 | Jones et al. |
| 4,984,432 | A | 1/1991 | Corey |
| 5,056,601 | A | 10/1991 | Grimmer |
| 5,058,385 | A | 10/1991 | Everett, Jr. |
| 5,062,498 | A | 11/1991 | Tobias |
| 5,107,681 | A | 4/1992 | Wolfbauer, III |
| 5,133,190 | A | 7/1992 | Abdelmalek |
| 5,138,838 | A | 8/1992 | Crosser |
| 5,140,170 | A | 8/1992 | Henderson |
| 5,152,260 | A | 10/1992 | Erickson et al. |
| 5,161,449 | A | 11/1992 | Everett, Jr. |
| 5,169,295 | A | 12/1992 | Stoqner et al. |
| 5,182,086 | A | 1/1993 | Henderson et al. |
| 5,203,168 | A | 4/1993 | Oshina |
| 5,209,063 | A | 5/1993 | Shirai et al. |
| 5,213,470 | A | 5/1993 | Lundquist |
| 5,239,833 | A | 8/1993 | Fineblum |
| 5,259,345 | A | 11/1993 | Richeson |
| 5,271,225 | A | 12/1993 | Adamides |
| 5,279,206 | A | 1/1994 | Krantz |
| 5,296,799 | A | 3/1994 | Davis |
| 5,309,713 | A | 5/1994 | Vassallo |
| 5,321,946 | A | 6/1994 | Abdelmalek |
| 5,327,987 | A | 7/1994 | Abdelmalek |
| 5,339,633 | A | 8/1994 | Fujii et al. |
| 5,341,644 | A | 8/1994 | Nelson |
| 5,344,627 | A | 9/1994 | Fujii et al. |
| 5,364,611 | A | 11/1994 | Iijima et al. |
| 5,365,980 | A | 11/1994 | Deberardinis |
| 5,375,417 | A | 12/1994 | Barth |
| 5,379,589 | A | 1/1995 | Cohn et al. |
| 5,384,489 | A | 1/1995 | Bellac |
| 5,387,089 | A | 2/1995 | Stogner et al. |
| 5,394,693 | A | 3/1995 | Plyter |
| 5,427,194 | A | 6/1995 | Miller |
| 5,436,508 | A | 7/1995 | Sorensen |
| 5,448,889 | A | 9/1995 | Bronicki |
| 5,454,408 | A | 10/1995 | Dibella et al. |
| 5,454,426 | A | 10/1995 | Moseley |
| 5,467,722 | A | 11/1995 | Meratla |
| 5,477,677 | A | 12/1995 | Krnavek |
| 5,491,969 | A | 2/1996 | Cohn et al. |
| 5,491,977 | A | 2/1996 | Cho |
| 5,524,821 | A | 6/1996 | Vie et al. |
| 5,537,822 | A | 7/1996 | Shnaid et al. |
| 5,544,698 | A | 8/1996 | Paulman |
| 5,561,978 | A | 10/1996 | Buschur |
| 5,562,010 | A | 10/1996 | McGuire |
| 5,579,640 | A | 12/1996 | Gray, Jr. et al. |
| 5,584,664 | A | 12/1996 | Elliott et al. |
| 5,592,028 | A | 1/1997 | Pritchard |
| 5,598,736 | A | 2/1997 | Erskine |
| 5,599,172 | A | 2/1997 | Mccabe |
| 5,600,953 | A | 2/1997 | Oshita et al. |
| 5,616,007 | A | 4/1997 | Cohen |
| 5,634,340 | A | 6/1997 | Grennan |
| 5,641,273 | A | 6/1997 | Moseley |
| 5,674,053 | A | 10/1997 | Paul et al. |
| 5,685,155 | A | 11/1997 | Brown |
| 5,768,893 | A | 6/1998 | Hoshino et al. |
| 5,769,610 | A | 6/1998 | Paul et al. |
| 5,771,693 | A | 6/1998 | Coney |
| 5,775,107 | A | 7/1998 | Sparkman |
| 5,778,675 | A | 7/1998 | Nakhamkin |
| 5,794,442 | A | 8/1998 | Lisniansky |
| 5,797,980 | A | 8/1998 | Fillet |
| 5,819,533 | A | 10/1998 | Moonen |
| 5,819,635 | A | 10/1998 | Moonen |
| 5,831,757 | A | 11/1998 | DiFrancesco |
| 5,832,728 | A | 11/1998 | Buck |
| 5,832,906 | A | 11/1998 | Douville et al. |
| 5,839,270 | A | 11/1998 | Jirnov et al. |
| 5,845,479 | A | 12/1998 | Nakhamkin |
| 5,873,250 | A | 2/1999 | Lewis |
| 5,901,809 | A | 5/1999 | Berkun |
| 5,924,283 | A | 7/1999 | Burke, Jr. |
| 5,934,063 | A | 8/1999 | Nakhamkin |
| 5,934,076 | A | 8/1999 | Coney |
| 5,937,652 | A | 8/1999 | Abdelmalek |
| 5,971,027 | A | 10/1999 | Beachley et al. |
| 6,012,279 | A | 1/2000 | Hines |
| 6,023,105 | A | 2/2000 | Youssef |
| 6,026,349 | A | 2/2000 | Heneman |
| 6,029,445 | A | 2/2000 | Lech |
| 6,073,445 | A | 6/2000 | Johnson |
| 6,073,448 | A | 6/2000 | Lozada |
| 6,085,520 | A | 7/2000 | Kohno |
| 6,090,186 | A | 7/2000 | Spencer |
| 6,119,802 | A | 9/2000 | Puett, Jr. |
| 6,132,181 | A | 10/2000 | Mccabe |
| 6,145,311 | A | 11/2000 | Cyphelly |
| 6,148,602 | A | 11/2000 | Demetri |
| 6,153,943 | A | 11/2000 | Mistr, Jr. |
| 6,158,499 | A | 12/2000 | Rhodes |
| 6,170,443 | B1 | 1/2001 | Hofbauer |
| 6,178,735 | B1 | 1/2001 | Frutschi |
| 6,179,446 | B1 | 1/2001 | Sarmadi |
| 6,188,182 | B1 | 2/2001 | Nickols et al. |
| 6,202,707 | B1 | 3/2001 | Woodall et al. |
| 6,206,660 | B1 | 3/2001 | Coney et al. |
| 6,210,131 | B1 | 4/2001 | Whitehead |
| 6,216,462 | B1 | 4/2001 | Gray, Jr. |
| 6,225,706 | B1 | 5/2001 | Keller |
| 6,276,123 | B1 | 8/2001 | Chen et al. |
| 6,327,858 | B1 | 12/2001 | Negre et al. |
| 6,327,994 | B1 | 12/2001 | Labrador |
| 6,349,543 | B1 | 2/2002 | Lisniansky |
| RE37,603 | E | 3/2002 | Coney |
| 6,352,576 | B1 | 3/2002 | Spencer et al. |
| 6,360,535 | B1 | 3/2002 | Fisher |
| 6,367,570 | B1 | 4/2002 | Long, III |
| 6,372,023 | B1 | 4/2002 | Kiyono et al. |
| 6,389,814 | B2 | 5/2002 | Viteri et al. |
| 6,397,578 | B2 | 6/2002 | Tsukamoto |
| 6,401,458 | B2 | 6/2002 | Jacobson |
| 6,407,465 | B1 | 6/2002 | Peltz et al. |
| 6,419,462 | B1 | 7/2002 | Horie et al. |
| 6,422,016 | B2 | 7/2002 | Alkhamis |
| 6,478,289 | B1 | 11/2002 | Trewin |
| 6,512,966 | B2 | 1/2003 | Lof |
| 6,513,326 | B1 | 2/2003 | Maceda et al. |
| 6,516,615 | B1 | 2/2003 | Stockhausen et al. |
| 6,516,616 | B2 | 2/2003 | Carver |
| 6,598,392 | B2 | 7/2003 | Majeres |
| 6,598,402 | B2 | 7/2003 | Kataoka et al. |
| 6,606,860 | B2 | 8/2003 | McFarland |
| 6,612,348 | B1 | 9/2003 | Wiley |
| 6,619,930 | B2 | 9/2003 | Jansen et al. |
| 6,626,212 | B2 | 9/2003 | Morioka et al. |
| 6,629,413 | B1 | 10/2003 | Wendt et al. |
| 6,637,185 | B2 | 10/2003 | Hatamiva et al. |
| 6,652,241 | B1 | 11/2003 | Alder |
| 6,652,243 | B2 | 11/2003 | Krasnov |
| 6,666,024 | B1 | 12/2003 | Moskal |
| 6,670,402 | B1 | 12/2003 | Lee et al. |

(56) References Cited

U.S. PATENT DOCUMENTS

| | | |
|---|---|---|
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Keller-sornig |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enish et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Neqre et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Sieqel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Neqre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | Bollinger et al. |
| 8,037,678 B2 | 10/2011 | McBride et al. |
| 8,046,990 B2 | 11/2011 | Bollinger et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |

(56) References Cited

U.S. PATENT DOCUMENTS

| | | |
|---|---|---|
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | McBride et al. |
| 2011/0296821 A1 | 12/2011 | Bollinger et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2012/0000557 A1 | 1/2012 | McBride et al. |
| 2012/0006013 A1 | 1/2012 | McBride et al. |

FOREIGN PATENT DOCUMENTS

| | | |
|---|---|---|
| CN | 1061262 | 5/1992 |
| CN | 1171490 | 1/1998 |
| CN | 1276308 | 12/2000 |

(56) References Cited

FOREIGN PATENT DOCUMENTS

| | | |
|---|---|---|
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 4/1976 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 2005047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-99/41498 | 8/1999 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03/021702 | 3/2003 |
| WO | WO-03/078812 | 9/2003 |
| WO | WO-03/081011 | 10/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |

(56) References Cited

FOREIGN PATENT DOCUMENTS

| | | |
|---|---|---|
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034421 | 3/2009 |
| WO | WO-2009/034548 | 3/2009 |
| WO | WO-2009/038973 | 3/2009 |
| WO | WO-2009/044139 | 4/2009 |
| WO | WO-2009/045110 | 4/2009 |
| WO | WO-2009045468 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

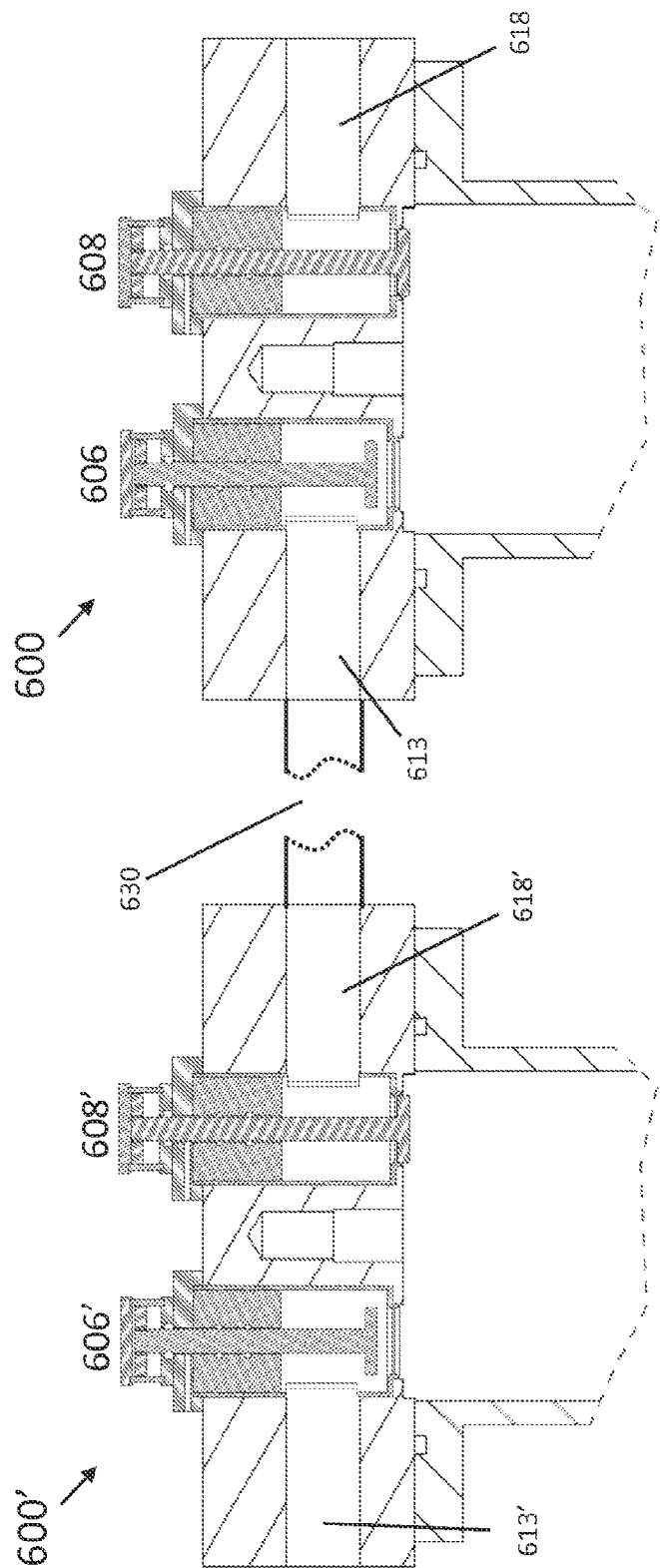

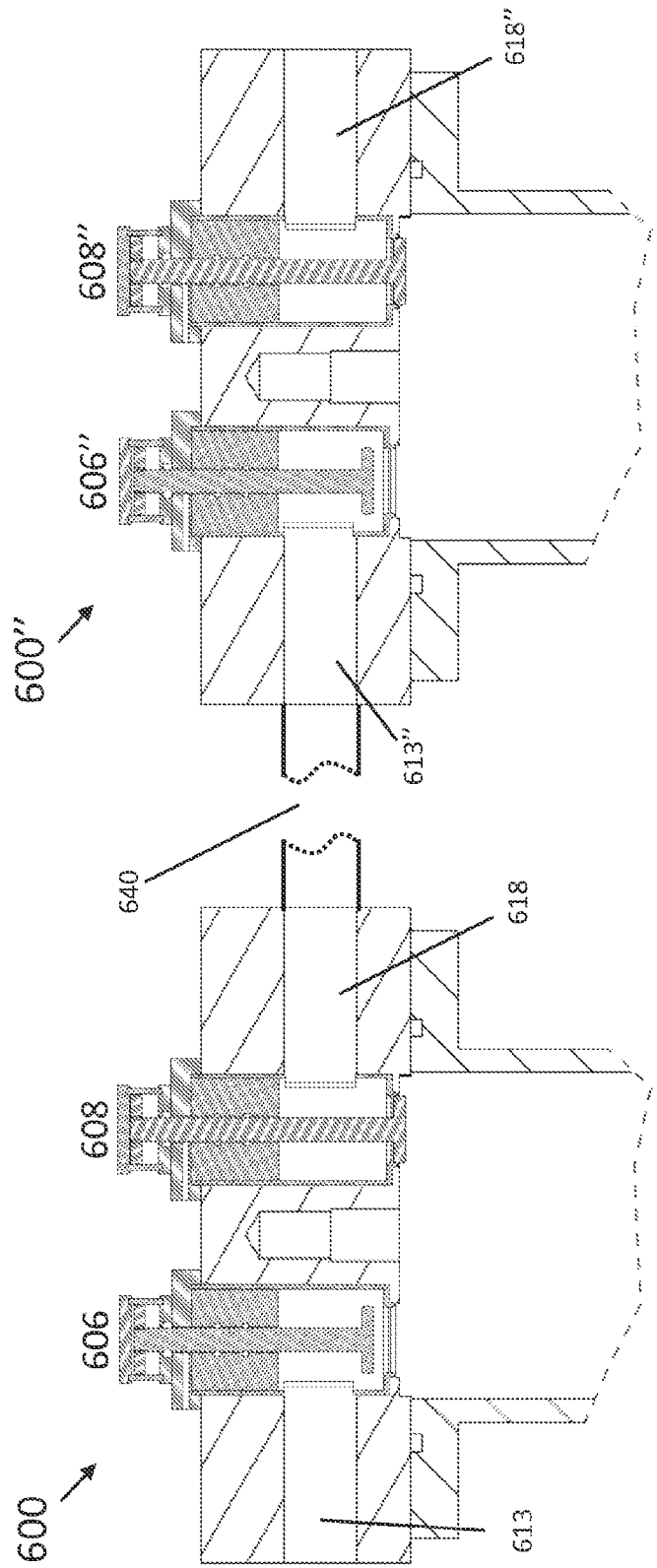

FLUID-FLOW CONTROL IN ENERGY STORAGE AND RECOVERY SYSTEMS

RELATED APPLICATION

This application claims the benefit of and priority to U.S. Provisional Patent Application No. 61/418,086, filed Nov. 30, 2010, the entire disclosure of which is hereby incorporated herein by reference.

STATEMENT REGARDING FEDERALLY SPONSORED RESEARCH

This invention was made with government support under IIP-0923633 awarded by the NSF and DE-OE0000231 awarded by the DOE. The government has certain rights in the invention.

FIELD OF THE INVENTION

In various embodiments, the present invention relates to pneumatics, hydraulics, power generation, and energy storage, and more particularly, to systems and methods using pneumatic, pneumatic/hydraulic, and/or hydraulic cylinders for energy storage and recovery.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207, filed Apr. 9, 2009 (the '207 patent) and U.S. Pat. No. 7,874,155, filed Feb. 25, 2010 (the '155 patent), the disclosures of which are hereby incorporated herein by reference in their entireties. The '207 and '155 patents disclose systems and techniques for expanding gas isothermally in staged cylinders and intensifiers over a large pressure range in order to generate electrical energy when required. Mechanical energy from the expanding gas may be used to drive a hydraulic pump/motor subsystem that produces electricity. Systems and techniques for hydraulic-pneumatic pressure intensification that may be employed in systems and methods such as those disclosed in the '207 and '155 patents are shown and described in U.S. Pat. No. 8,037,678, filed Sep. 10, 2010 (the '678 patent), the disclosure of which is hereby incorporated herein by reference in its entirety.

In the systems disclosed in the '207 and '155 patents, reciprocal mechanical motion is produced during recovery of energy from storage by expansion of gas in the cylinders. This reciprocal motion may be converted to electricity by a variety of techniques, for example as disclosed in the '678 patent as well as in U.S. patent application Ser. No. 12/938,853, filed Nov. 3, 2010 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

Unfortunately, the efficiency of compressed-gas energy-conversion systems may be limited by the valving systems that control flow of the gas (and/or other fluid) into and out of the cylinder. For example, conventional designs may entail valve arrangements that do not prevent contamination between actuation fluid and working fluid, that do not prevent damage from hydrolocking, that require excessive actuation energy, that require an excessive time to actuate (i.e., open and close), that have excessive pressure drops, that do not fail shut (e.g., that prevent the unwanted venting of high-pressure gas when power to valve actuation mechanisms fails), that contain dead space in piping, and that have other disadvantages.

SUMMARY

Embodiments of the invention increase the efficiency and reliability with which fluid (i.e., gas, liquid, or a mixture of gas and liquid) may be admitted to or exhausted from a pneumatic or pneumatic-hydraulic cylinder that is part of an energy-conversion system. Embodiments of the invention employ one or more valves (e.g., poppet-type valves) that may be integrated into the head of the cylinder. These valves provide quick valve action, high flow coefficient (i.e., low pressure drop through the valve for high flow), separation of gas/liquid flow from the valve's hydraulic or other actuation mechanism, protection against loss of pressurized fluid with failure of valve-actuation power, and other advantages, some of which are described below. By increasing the efficiency of valve action, embodiments of the invention increase the overall efficiency of the energy-conversion system. Embodiments of the invention also employ valves, piping, and other components arranged to assure that a valve or valves integrated into the head of a cylinder may be opened regardless of the pressure within the cylinder relative to the pressure in the piping whose communication with the interior of the cylinder is governed by the integrated valve or valves. The aforementioned advantages are all provided by embodiments of the invention. Other advantages accruing therefrom are not described but are contemplated and within the scope of the invention.

In various embodiments of energy-conversion systems described in the '207 patent, the '155 patent, and U.S. Pat. No. 7,802,426, filed Jun. 9, 2009 (the '426 patent, the entire disclosure of which is incorporated by reference herein), gas is admitted into a chamber of a cylinder at a range of pressures. After being expanded or compressed within the chamber, the gas is exhausted from the chamber. The source of the gas admitted into the chamber and the destination of the gas exhausted from the chamber may be different. For example, gas may be admitted to the chamber from a high-pressure reservoir (or "store") and exhausted from the chamber to a vent or to a chamber within another cylinder. A separate valve is typically required to regulate gas flow to each source or destination. It is desirable for valves regulating gas flow to and from a cylinder to operate quickly; fail into a closed position if their electric, hydraulic, or other source(s) of actuating power fail; have high flow coefficient $C_v$, a dimensionless number used to characterize valve performance (high $C_v$ is achieved when there is low pressure drop through the valve for high flow); and reliably separate the gated-flow side of the valve from the electric, hydraulic, or other actuating mechanism of the valve. In various embodiments it is desirable to equip the valves with additional features, as detailed below.

Embodiments of the present invention advantageously incorporate a control system and valve arrangement that improves the efficiency of the energy storage and recovery when compared to a passive (i.e., check-only actuation) or fixed-timing actuation scheme. Fixed-timing actuation schemes may include systems in which the valve timing is set based on cylinder-piston position, such as a camshaft-based valve actuation scheme that may be tied to a crankshaft rotation by a timing belt (as in many combustion engines). Fixed actuation schemes are typically limited by an inability to adjust valve timing based on feedback from various system parameters (such feedback-based control being incorporated into various embodiments of the present invention). In a compressed air energy storage system in which stroke time (or cycle speed) and/or valve open and close timings may be varied as storage pressure is changed, a variable valve timing scheme such as described herein (in accordance with various embodiments of the invention) may allow for the adjustment of valve timing to optimize performance and improve efficiency, including reduction of pressure differentials through valves (both improving efficiency and reducing potentially damaging force spikes), reduction of actuation energies required to actuate valves, and overall reduction of valve impact forces, system vibrations, and other negative impacts on system life.

Gas undergoing expansion tends to cool, while gas undergoing compression tends to heat. To maximize efficiency (i.e., the fraction of elastic potential energy in the compressed gas that is converted to work, or vice versa), gas expansion and compression should be as near isothermal (i.e., constant-temperature) as possible. Several techniques of approximating isothermal expansion and compression may be employed in accordance with embodiments of the invention.

First, as described in the '426 patent, gas undergoing either compression or expansion may be directed, continuously or in installments, through a heat-exchange subsystem external to the cylinder. The heat-exchange subsystem either rejects heat to the environment (to cool gas undergoing compression) or absorbs heat from the environment (to warm gas undergoing expansion). An isothermal process may be approximated via judicious selection of this heat-exchange rate.

Additionally, as described in the '155 patent, droplets of a liquid (e.g., water) may be sprayed into a chamber of the cylinder in which gas is presently undergoing compression (or expansion) in order to transfer heat to or from the gas. As the liquid droplets exchange heat with the gas around them, the temperature of the gas is raised or lowered; the temperature of the droplets is also raised or lowered. The liquid is evacuated from the cylinder through a suitable mechanism. The heat-exchange spray droplets may be introduced through a spray head (in, e.g., a vertical cylinder), through a spray rod arranged coaxially with the cylinder piston (in, e.g., a horizontal cylinder), or by any other mechanism that permits formation of a liquid spray within the cylinder. Droplets may be used to either warm gas undergoing expansion or to cool gas undergoing compression. Again, an isothermal process may be approximated via judicious selection of this heat-exchange rate. When such liquid heat exchange is utilized, the contents of the chamber may include or consist essentially of a mixture of liquid and gas. Any valve used to admit gas to and/or exhaust gas from the chamber preferably accommodates flow of a liquid-gas mixture. Such two-phase flow may exceed a particular quality factor (e.g., >10% volume of liquid compared to the volume of gas, and in some cases >25% volume of liquid).

Various embodiments of the invention relate to a modified cylinder assembly. The piston within the cylinder divides the interior of the cylinder into two tubular chambers. Each tubular chamber is bounded at one end by the piston and at the other end by an end cap. In one embodiment of the invention, two or more hydraulically, electrically, or mechanically operated two-port poppet valves pass through one of the heads of the cylinder. Each valve comprises a body, actuating mechanism, stem, ring, disc (valve member), two ports, and seat. Each valve contains a chamber, herein termed the flow chamber, through which fluid may flow.

In each valve, two ports (openings) allow communication between the interior of the valve chamber and the exterior of the valve. One port is typically open at all times and may be connected to a pipe; this port is herein termed the "outside port." The other port communicates with the interior of the cylinder and is gated by the disc; this port is herein termed the "gated port."

One end of the stem, herein termed the "distal end," is connected to an actuating mechanism that causes the stem to move along its axis; the other end of the stem, herein termed the "proximal end," is connected to the disc, which is a body of material wider than the stem. The distal end of the stem is farther from the gated port than the proximal end. When the valve is closed, the stem has reached its limit of motion in the proximal direction and the peripheral edge or surface of the disc is in contact with the seat, i.e., a tapered surface or flange surrounding the gated port.

The two or more valves are typically of at least two types. In one type of valve, the disc is outside the flow chamber. When the valve is open, the stem is at its limit of motion in the proximal direction (i.e., toward the gated port) and the disc is outside the flow chamber and out of contact with the seat, allowing fluid to flow between the flow chamber and the cylinder chamber through the gated port. When the valve is closed, the stem is at its limit of motion in the distal direction (i.e., away from the gated port) and the disc is in contact with the seat. A valve of this type is herein termed a "low-side valve."

In another type of valve, the disc is inside the flow chamber. When the valve is open, the stem is at its limit of motion in the distal direction (i.e., away from cylinder chamber) and the disc is positioned inside the flow chamber and out of contact with the seat, allowing fluid to flow between the flow chamber and the cylinder chamber through the gated port. When the valve is closed, the stem is at its limit of motion in the proximal direction (i.e., toward the gated port) and the disc is in contact with the seat. A valve of this type is herein termed a "high-side valve."

When the cylinder is operated as an expander, gas stored high pressure (e.g., approximately 3,000 psi) in a reservoir is admitted to the cylinder assembly through piping and a high-side valve. In an initial state, the fluid gas or gas-liquid mixture within the cylinder chamber is at equal or lower pressure than the gas in the high-pressure reservoir. The high-side valve is open and the low-side valve is closed. High-pressure gas enters the flow chamber of the high-side valve through the high-side valve's outside port. The high-side valve is open, so the disc is not in contact with the seat and both the outside port and the gated port are open. Gas from the high-pressure store flows through the inlet valve into the cylinder.

In this initial state, the low-side valve is in a closed position. That is, the gated port is occluded by the disc, which is in contact with the seat. Herein, the side of a valve disc connected to the stem is termed the "inner side" of the disc and the opposing side of the disc is termed the "outer side" of the disc. When a high-side or low-side valve is closed, fluid inside the flow chamber of the valve impinges on the inner side of the disc and the fluid contents of the cylinder chamber impinge on the outer side of the disc. Force is thus exerted on the disc by fluid on both sides of the disc. Force may also be exerted on the disc by the stem through an actuation mechanism. If the stem and the fluid within the flow chamber of a closed low-side valve exert a greater total force on the disc than the fluid within the cylinder chamber, the disc remains in contact with the seat and the gated port remains closed. If the stem and the fluid within the flow chamber of a low-side valve exert a smaller combined force on the disc than the fluid within the cylinder chamber, the disc moves in the distal direction (i.e., away from the seat) and the gated port opens.

In the initial state described above, the cylinder chamber fills with high-pressure gas. The outside port of the low-side valve communicates through piping with a body of gas at lower pressure, e.g., the atmosphere or the contents of another cylinder. The force exerted by the fluid within the flow chamber is smaller than the total force on the disc from the fluid within the cylinder chamber and any stem forces exerted by the actuation mechanism. The gated port therefore remains occluded by the disc, i.e., the low-side valve remains closed. No force need be supplied by the activation mechanism of the low-side valve for the valve to remain closed in this state or any other state in which the contents of the cylinder chamber exerts more force on the disc than do the contents of the flow chamber. The low-side valve may thus fail shut.

In a subsequent operating state, the gaseous component of the fluid within the cylinder chamber has expanded to a pressure (e.g., approximately 300 psi) below that of the high-pressure store. It will be evident to any person reasonably familiar with the art of pneumatic and hydraulic machinery that the high-side valve will fail shut in this operating state, i.e., no force need be supplied by the activation mechanism of the high-side valve in order for the high-side valve to remain closed. In this operating state, sufficient force applied to the stem of the low-side valve by the activation mechanism of the low-side valve will open the low-side valve, allowing fluid within the cylinder chamber to be exhausted through the low-side valve.

In other modes of operation of the embodiment, not explicitly described, gas may be admitted through the low-side valve, compressed within the cylinder chamber, and forced through the high-side valve to the high-pressure store. In compression mode, the valves may be operated in a check-valve mode, wherein no external actuation force is required.

In embodiments of the invention, provision is made for applying adequate opening force to a poppet valve even if an unusually high pressure difference between the interior and exterior of the valve is tending to keep the valve closed. Higher force may be contingently applied to the stem of the valve, overcoming the closure-favoring force produced by the said pressure differential, in one embodiment by using valves to direct a higher-pressure fluid to the activation mechanism of the poppet valve, or in another embodiment by directing pressurized fluid to a secondary or contingency actuation mechanism that acts on the valve stem independently of, or in concert with, the usual (lower-force) activation mechanism. Such provision allows lower activation energy during normal operation while allowing the valve to be opened under pressure differential conditions that may be unusual or untoward.

Embodiments of the invention also include provisions for relieving unusual, untoward, or excessive pressure within a cylinder chamber that may be communicated to the activation mechanism of a poppet valve. Such anti-overpressure or anti-hydrolocking provisions may prevent damage to system components. As known to those of skill in the art, hydrolock (or hydrostatic lock) occurs when a cylinder designed for gaseous or two-phase (e.g., gas and liquid mix) compression is filled with a nearly incompressible liquid (e.g., water) during a part of the compression process. With closed valves (or opened but valves enabling insufficient flow) and continued force piston motion, damage to the cylinder, rod, or other components may occur. Preferred embodiments of the present invention incorporate valve areas and actuation mechanisms designed to check open and allow flow at a reasonable pressure differential (e.g., <20% of absolute pressure) during an accidental hydrolock event, even at maximal piston speeds, thus preventing component damage.

Embodiments of the present invention are typically utilized in energy storage and generation systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or by another boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '678 patent and the '853 application. Moreover, a motor/generator may be coupled to the transmission mechanism. Alternatively or additionally, the shaft of the cylinders may be coupled to one or more linear generators, as described in the '853 application.

As also described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to more than two cylinders to suit particular applications. For example, a narrower output force range for a given range of reservoir pressures is achieved by having a first, high-pressure cylinder operating between, for example, approximately 3,000 psig and approximately 300 psig and a second, larger-volume, lower-pressure cylinder operating between, for example, approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '678 patent, N appropriately sized cylinders can reduce an original operating pressure range R to $R^{1/N}$. Any group of N cylinders staged in this manner, where N≥2, is herein termed a cylinder group.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

The systems described herein, and/or other embodiments employing liquid-spray heat exchange or external gas heat exchange, may draw or deliver thermal energy via their heat-exchange mechanisms to external systems (not shown) for purposes of cogeneration, as described in U.S. Pat. No. 7,958,731, filed Jan. 20, 2010 (the '731 patent), the entire disclosure of which is incorporated by reference herein.

The compressed-air energy storage and recovery systems described herein are preferably "open-air" systems, i.e., systems that take in air from the ambient atmosphere for compression and vent air back to the ambient after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. The systems also include (i) a reservoir for storage of compressed gas after compression and supply of compressed gas for expansion thereof, and (ii) a vent for exhausting expanded gas to atmosphere after expansion and supply of gas for compression. The storage reservoir may include or consist essentially of, e.g., one or more one or more pressure vessels (i.e., containers for compressed gas that may have rigid exteriors or may be inflatable, and that may be formed of various suitable materials such as metal or plastic) or caverns (i.e., naturally occurring or artificially created cavities that are typically located underground). Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature an energy storage and recovery system that includes a cylinder assembly for compression of gas to store energy and/or expansion of gas to recover energy therewithin, the cylinder assembly having an interior compartment and an end cap disposed at one end. Integrated within the end cap are (i) a first valve for admitting fluid into the interior compartment of the cylinder assembly prior to expansion and exhausting fluid from the interior compartment of the cylinder assembly after compression and (ii) a second valve for exhausting fluid from the interior compartment of the cylinder assembly after expansion and admitting fluid into the interior compartment of the cylinder assembly prior to compression. Each of the first and second valves controls fluid communication with the interior compartment via a separate fluid path, and each comprises a gated port and an outside port. The system also includes a first actuation mechanism for actuating the first valve and a second actuation mechanism for actuating the second valve, as well as a control system for controlling the first and second actuation mechanisms based at least in part on the pressure inside the interior compartment of the cylinder assembly, the position of the gated port of the first valve, and/or the position of the gated port of the second valve.

Embodiments of the invention incorporate one or more of the following in any of a variety of combinations. The control system may reduce the pressure differential through the first valve and/or second valve during fluid flow therethrough, thereby increasing efficiency of the energy storage and recovery. The first valve may be a high-side valve (which may check open and/or open (via motion of the gated-port disc) away from the interior compartment of the cylinder assembly). The second valve may be a low-side valve (which may check open and/or open (via motion of the gated-port disc) toward the interior compartment of the cylinder assembly). The outside port of the first valve may be in selective communication with a compressed-gas reservoir or with a second cylinder assembly configured for expansion and/or compression of gas at a higher range of pressures than the pressure range of the expansion or compression within the interior compartment of the cylinder assembly. The outside port of the second valve may be in selective communication with a vent to atmosphere or a second cylinder assembly configured for expansion and/or compression of gas at a lower range of pressures than the pressure range of the expansion or compression within the interior compartment of the cylinder assembly. The first and/or second actuation mechanisms may be hydraulic, electrical, and/or mechanical. Each of the first and second valves may include a disc that selectively closes its gated port. Each disc may be larger than its respective gated port, such that, in the absence of applied actuation power controlling movement of the disc, gas in the interior compartment is prevented from flowing through at least one of the gated ports. The gated port of the first valve may be disposed between the disc of the first valve and the interior compartment. The disc of the second valve may be disposed between the gated port of the second valve and the interior compartment.

The interior compartment may be a pneumatic chamber. A movable boundary mechanism that separates the interior compartment from a second interior compartment may be disposed within the cylinder assembly. The second interior compartment may be a pneumatic chamber or a hydraulic chamber. The outside ports of the first and second valves may each be in communication with a separate channel disposed within the end cap. The system may include a mechanism (e.g., a spray head and/or a spray rod) for introducing heat-exchange fluid into the interior compartment. The first valve and the second valve may both be configured for exhausting two-phase flow of gas and heat-exchange fluid from the interior compartment.

The first and/or second actuation mechanism may be configured for (i) applying a first actuation force against a first pressure differential between a pressure in the interior compartment and a pressure within the valve between the gated port and the outside port and (ii) applying a second actuation force greater than the first actuation force against a second pressure differential, greater than the first pressure differential, between the pressure in the interior compartment and the pressure within the associated valve between the gated port and the outside port. The cylinder assembly may be configured to operate at the first pressure differential during normal operation. The first and/or second actuation mechanism may include or consist essentially of a hydraulic mechanism selectively connectable to (i) a first source of fluid at a pressure sufficient to provide an actuation force greater than a force resulting from the first pressure differential and less than a force resulting from the second pressure differential and (ii) a second source of fluid at a pressure greater than the pressure of the first source of fluid and sufficient to provide an actuation force greater than the force resulting from the second pressure differential. The first and/or second actuation mechanism may include two chambers separated by a boundary mechanism, as well as a mechanism for selectively connecting (i) one of the chambers to the first source of fluid and the second source of fluid and (ii) the other chamber to a body of fluid at a pressure less than the pressure of the first source of fluid. The first and/or second actuation mechanism may include a first unit including or consisting essentially of (i) two chambers separated by a boundary mechanism and (ii) a mechanism for selectively connecting one of the chambers to the first source of fluid and the other chamber to a body of fluid at a pressure less than the pressure of the first fluid, and a second unit including or consisting essentially of (i) two chambers separated by a boundary mechanism and (ii) a mechanism for selectively connecting (a) one of the chambers to the second source of fluid and the other chamber to a body of fluid at a pressure less than the pressure of the first fluid or (b) both chambers to a body of fluid at a pressure less than the pressure of the first fluid. A stem may extend through the first unit and the second unit and be mechanically coupled to the boundary mechanisms of the first unit and the second unit.

The first and/or second actuation mechanism may be configured for (i) applying an actuation force against a pressure differential between a pressure in the interior compartment and a pressure within the associated valve between the gated port and the outside port and (ii) opening the associated valve when a pressure within the interior compartment exceeds a threshold pressure, thereby relieving an overpressure within the cylinder assembly. The first and/or second actuation mechanism may include or consist essentially of a hydraulic mechanism selectively connectable to (i) a first source of fluid at a pressure sufficient to provide an actuation force greater than a force resulting from the pressure differential, (ii) a second source of fluid at a pressure less than the pressure of the first source of fluid, and (iii) a sequence valve connectable to the second source of fluid. The first and/or second actuation mechanism may include or consist essentially of two chambers separated by a boundary mechanism, and a mechanism for selectively connecting one of the chambers to the first source of fluid and one of the chambers to the second source of fluid, the sequence valve being connected to both chambers in parallel to the first and second sources of fluid. The sequence valve may be configured to divert fluid to the second source of fluid when the pressure within the interior compartment exceeds the threshold pressure, thereby opening the associated valve.

The system may include, integrated within the end cap and separate from the first and second valves, a mechanism for exhausting fluid from the interior compartment when the pressure within the interior compartment exceeds a threshold pressure. A source of compressed gas at a first pressure may be fluidly connectable to the cylinder assembly through the first valve, and the threshold pressure may exceed the first pressure by a pressure differential. The mechanism may include or consist essentially of a check valve disposed within a conduit between the source of compressed gas and the interior compartment, and the cracking pressure of the check valve may be approximately equal to the pressure differential.

The first and/or second valve may be configured to check open, enabling fluid communication with the interior compartment of the cylinder assembly, in the absence of actuation force applied by its actuation mechanism. The second valve may be configured to check open and enable fluid flow therethrough at a pressure differential less than approximately 20% of the pressure within the cylinder assembly during a hydrolock event, thereby preventing hydrolock damage to the cylinder assembly. The control system may actuate open the first valve at a pressure (i) outside the interior compartment (e.g., within the fluid path leading to the first valve), (ii) acting on the first valve, and (iii) insufficient to check open the first valve, thereby reducing the pressure differential during fluid flow through the first valve. The control system may actuate open the second valve at a pressure (i) within the interior compartment, (ii) acting on the second valve, and (iii) insufficient to check open the second valve, thereby reducing the pressure differential during fluid flow through the second valve. An intermittent renewable energy source (e.g., of wind or solar energy) may be connected to the cylinder assembly. Energy stored during compression of the gas may originate from the intermittent renewable energy source, and energy may be recovered via expansion of the gas when the intermittent renewable energy source is nonfunctional.

In another aspect, embodiments of the invention feature an energy storage and recovery system including or consisting essentially of a cylinder assembly (i) for, therewithin, at least one of the compression of gas to store energy or the expansion of gas to recover energy and (ii) having an interior compartment, a valve for admitting fluid into the interior compartment and/or exhausting fluid from the interior compartment, and an actuation mechanism for actuating the valve with a first actuation force or a second actuation force greater than the first actuation force, the valve being configured to actuate with the first actuation force during normal operation of the cylinder assembly.

Embodiments of the invention incorporate one or more of the following in any of a variety of combinations. The second actuation force may exceed the first actuation force by at least a factor of 10. The valve may include a gated port and an outside port. The valve may be configured to apply the first and second actuation forces against, respectively, first and second pressure differentials between the pressure in the interior compartment and the pressure within the valve between the gated port and the outside port, the second pressure differential being greater than the first pressure differential. The actuation mechanism may include or consist essentially of a hydraulic mechanism selectively connectable to (i) a first source of fluid at a pressure sufficient to provide an actuation force greater than a force resulting from the first pressure differential and less than a force resulting from the second pressure differential and (ii) a second source of fluid at a pressure greater than the pressure of the first source of fluid and sufficient to provide an actuation force greater than the force resulting from the second pressure differential. The actuation mechanism may include or consist essentially of two chambers separated by a boundary mechanism, and a mechanism for selectively connecting (i) one of the chambers to the first source of fluid and the second source of fluid and (ii) the other chamber to a body of fluid at a pressure less than the pressure of the first source of fluid. The actuation mechanism may include or consist essentially of a first unit including or consisting essentially of (i) two chambers separated by a boundary mechanism and (ii) a mechanism for selectively connecting one of the chambers to the first source of fluid and the other chamber to a body of fluid at a pressure less than the pressure of the first fluid, and a second unit including or consisting essentially of (i) two chambers separated by a boundary mechanism and (ii) a mechanism for selectively connecting (a) one of the chambers to the second source of fluid and the other chamber to a body of fluid at a pressure less than the pressure of the first fluid or (b) both chambers to a body of fluid at a pressure less than the pressure of the first fluid. A stem may extend through the first unit and the second unit and be mechanically coupled to the boundary mechanisms of the first unit and the second unit.

In yet another aspect, embodiments of the invention feature an energy storage and recovery system including or consisting essentially of a cylinder assembly (i) for, therewithin, the compression of gas to store energy and/or the expansion of gas to recover energy and (ii) having an interior compartment, a valve for admitting fluid into the interior compartment and/or exhausting fluid from the interior compartment, and an actuation mechanism for (i) actuating the valve during normal operation of the cylinder assembly and (ii) opening the valve when a pressure within the interior compartment exceeds a threshold pressure, thereby relieving an overpressure within the cylinder assembly.

Embodiments of the invention incorporate one or more of the following in any of a variety of combinations. The cylinder assembly may be configured to perform the compression and/or expansion over a pressure range extending from a first pressure to a second pressure larger than the first pressure. The threshold pressure may be greater than the second pressure. The valve may include a gated port and an outside port. The valve may be configured to actuate the valve via application of an actuation force against a pressure differential between the pressure in the interior compartment and the pressure within the valve between the gated port and the outside port. The actuation mechanism may include or consist essentially of a hydraulic mechanism selectively connectable to (i) a first source of fluid at a pressure sufficient to provide an actuation force greater than a force resulting from the pressure differential, (ii) a second source of fluid at a pressure less than the pressure of the first source of fluid, and (iii) a sequence valve connectable to the second source of fluid. The actuation mechanism may include or consist essentially of two chambers separated by a boundary mechanism, and a mechanism for selectively connecting one of the chambers to the first source of fluid and one of the chambers to the second source of fluid, the sequence valve being connected to both chambers in parallel to the first and second sources of fluid. The sequence valve may be configured to divert fluid to the second source of fluid when the pressure within the interior compartment exceeds the threshold pressure, thereby opening the valve.

In an additional aspect, embodiments of the invention feature an energy storage and recovery system including or consisting essentially of a cylinder assembly (i) for, therewithin, at least one of the compression of gas to store energy or the expansion of gas to recover energy and (ii) having an interior compartment, a valve for admitting fluid into the interior compartment and/or exhausting fluid from the interior compartment, and separate from the valve, a mechanism for exhausting fluid from the interior compartment when the pressure within the interior compartment exceeds a threshold pressure.

Embodiments of the invention incorporate one or more of the following in any of a variety of combinations. The cylinder assembly may be configured to perform the compression and/or expansion over a pressure range extending from a first pressure to a second pressure larger than the first pressure. The threshold pressure may be greater than the second pressure. A source of compressed gas at a first pressure may be fluidly connectable to the cylinder assembly through the valve. The threshold pressure may exceed the first pressure by a pressure differential. The mechanism may include or consist essentially of a check valve disposed within a conduit between the source of compressed gas and the interior compartment. The cracking pressure of the check valve may be approximately equal to the pressure differential. The conduit may be disposed within an end cap of the cylinder assembly. The valve may be disposed within the end cap of the cylinder assembly.

In a further aspect, embodiments of the invention feature a method for energy storage and recovery that includes or consists essentially of, within a cylinder assembly, compressing gas to store energy and/or expanding gas to recover energy, during normal operation of the cylinder assembly, admitting fluid into and/or exhausting fluid from the cylinder assembly by actuating a valve with a first actuation force, and only when the pressure within the cylinder assembly exceeds a threshold pressure, actuating the valve with a second actuation force greater than the first actuation force.

In yet a further aspect, embodiments of the invention feature a method for energy storage and recovery that includes or consists essentially of, within a cylinder assembly and over a pressure range extending from a first pressure to a second pressure greater than the first pressure, compressing gas to store energy and/or expanding gas to recover energy, during normal operation of the cylinder assembly, admitting fluid into and/or exhausting fluid from the cylinder assembly by actuating at least one valve, and only when the pressure within the cylinder assembly exceeds a threshold pressure, thereby forming an overpressure, relieving the overpressure without actuating the at least one valve. Relieving the overpressure may include or consist essentially of exhausting fluid from the cylinder assembly through a conduit unconnected to the at least one valve. Relieving the overpressure may include or consist essentially of opening a check valve disposed within the conduit. The exhaustion of fluid from the cylinder assembly may open a check valve disposed within the conduit, the check valve having a cracking pressure approximately equal to the overpressure.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. At least one of the two ends of a chamber may be closed by end caps, also herein termed "heads." As utilized herein, an "end cap" is not necessarily a component distinct or separable from the remaining portion of the cylinder, but may refer to an end portion of the cylinder itself. Rods, valves, and other devices may pass through the end caps. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '678 patent and the '853 application. As used herein, "thermal conditioning" of a heat-exchange fluid does not include any modification of the temperature of the heat-exchange fluid resulting from interaction with gas with which the heat-exchange fluid is exchanging thermal energy; rather, such thermal conditioning generally refers to the modification of the temperature of the heat-exchange fluid by other means (e.g., an external heat exchanger). The terms "heat-exchange" and "heat-transfer" are generally utilized interchangeably herein. Unless otherwise indicated, motor/pumps described herein are not required to be configured to function both as a motor and a pump if they are utilized during system operation only as a motor or a pump but not both. Gas expansions described herein may be performed in the absence of combustion (e.g., in the manner of an internal-combustion cylinder).

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which:

FIGS. 6C and 6D are schematic drawings of cylinder assemblies in selective fluid communication in accordance with various embodiments of the invention;

DETAILED DESCRIPTION

Figure 1:
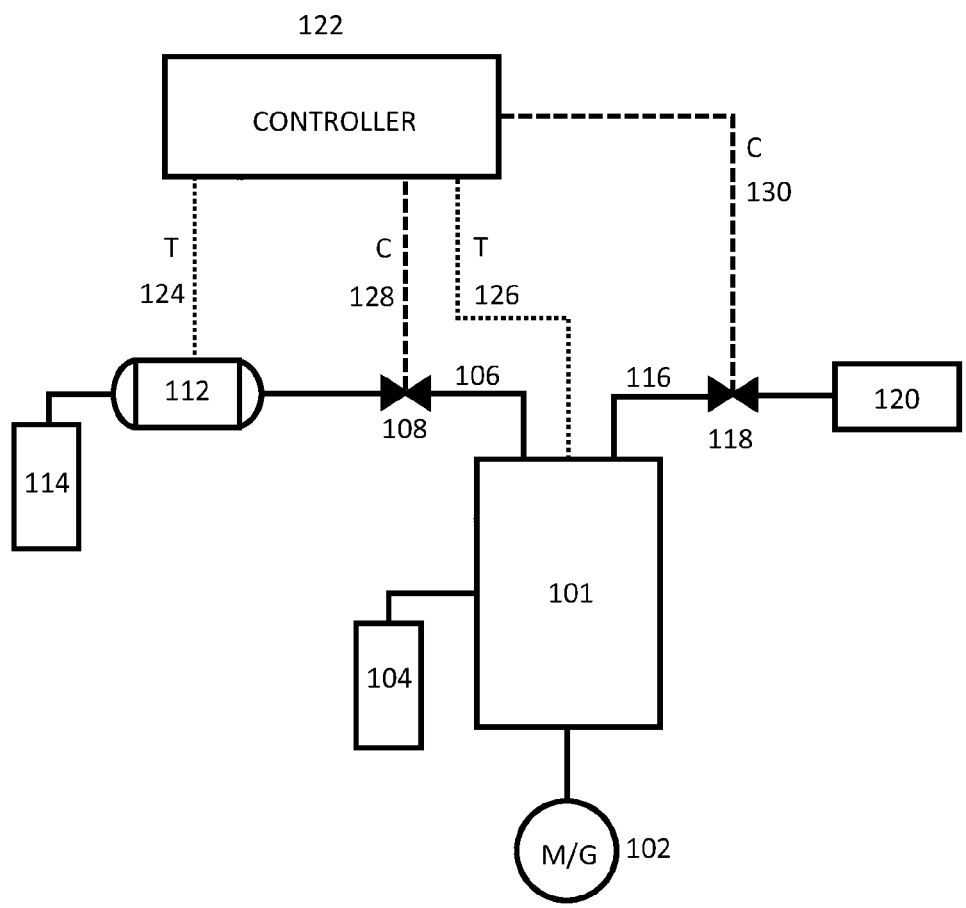
FIG. 1 is a schematic drawing of a compressed-gas energy storage system in accordance with various embodiments of the invention.

FIG. 1 depicts an illustrative system 100 that may be part of a larger system, not otherwise depicted, for the storage and release of energy. Subsequent figures will clarify the application of embodiments of the invention to such a system. The system 100 depicted in FIG. 1 features an assembly 101 for compressing and expanding gas. Expansion/compression assembly 101 may include or consist essentially of either one or more individual devices for expanding or compressing gas (e.g., turbines or cylinder assemblies that each may house a moveable boundary mechanism) or a staged series of such devices, as well as ancillary devices (e.g., valves) not depicted explicitly in FIG. 1.

An electric motor/generator 102 (e.g., a rotary or linear electric machine) is in physical communication (e.g., via hydraulic pump, piston shaft, or mechanical crankshaft) with the expansion/compression assembly 101. The motor/generator 102 may be electrically connected to a source and/or sink of electric energy not explicitly depicted in FIG. 1 (e.g., an electrical distribution grid or a source of renewable energy such as one or more wind turbines or solar cells).

The expansion/compression assembly 101 may be in fluid communication with a heat-transfer subsystem 104 that alters the temperature and/or pressure of a fluid (i.e., gas, liquid, or gas-liquid mixture) extracted from expansion/compression assembly 101 and, after alteration of the fluid's temperature and/or pressure, returns at least a portion of it to expansion/ compression assembly 101. Heat-transfer subsystem 104 may include pumps, valves, and other devices (not depicted explicitly in FIG. 1) ancillary to its heat-transfer function and to the transfer of fluid to and from expansion/compression assembly 101. Operated appropriately, the heat-transfer subsystem 104 enables substantially isothermal compression and/or expansion of gas inside expansion/compression assembly 101.

Connected to the expansion/compression assembly 101 is a pipe 106 with a control valve 108 that controls a flow of fluid (e.g., gas) between assembly 101 and a storage reservoir 112 (e.g., one or more pressure vessels and/or caverns). The storage reservoir 112 may be in fluid communication with a heat-transfer subsystem 114 that alters the temperature and/or pressure of fluid removed from storage reservoir 112 and, after alteration of the fluid's temperature and/or pressure, returns it to storage reservoir 112. A second pipe 116 with a control valve 118 may be in fluid communication with the expansion/compression assembly 101 and with a vent 120 that communicates with a body of gas at relatively low pressure (e.g., the ambient atmosphere).

A control system 122 receives information inputs from any of expansion/compression assembly 101, storage reservoir 112, and other components of system 100 and sources external to system 100. These information inputs may include or consist essentially of pressure, temperature, and/or other telemetered measurements of properties of components of system 101. Such information inputs, here generically denoted by the letter "T," are transmitted to control system 122 either wirelessly or through wires. Such transmission is denoted in FIG. 1 by dotted lines 124, 126.

The control system 122 may selectively control valves 108 and 118 to enable substantially isothermal compression and/or expansion of a gas in assembly 101. Control signals, here generically denoted by the letter "C," are transmitted to valves 108 and 118 either wirelessly or through wires. Such transmission is denoted in FIG. 1 by dashed lines 128, 130. The control system 122 may also control the operation of the heat-transfer assemblies 104, 114 and of other components not explicitly depicted in FIG. 1. The transmission of control and telemetry signals for these purposes is not explicitly depicted in FIG. 1.

The control system 122 may be any acceptable control device with a human-machine interface. For example, the control system 122 may include a computer (for example a PC-type) that executes a stored control application in the form of a computer-readable software medium. More generally, control system 122 may be realized as software, hardware, or some combination thereof. For example, control system 122 may be implemented on one or more computers, such as a PC having a CPU board containing one or more processors such as the Pentium, Core, Atom, or Celeron family of processors manufactured by Intel Corporation of Santa Clara, Calif., the 680×0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 122 are provided by software, the program may be written in any one of a number of high-level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

As described above, the control system 122 may receive telemetry from sensors monitoring various aspects of the operation of system 100, and may provide signals to control valve actuators, valves, motors, and other electromechanical/electronic devices. Control system 122 may communicate with such sensors and/or other components of system 100 (and other embodiments described herein) via wired or wireless communication. An appropriate interface may be used to convert data from sensors into a form readable by the control system 122 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

System 100 may be operated so as to compress gas admitted through the vent 120 and store the gas thus compressed in reservoir 112. For example, in an initial state of operation, valve 108 is closed and valve 118 is open, admitting a quantity of gas into expansion/compression assembly 101. When a desired quantity of gas has been admitted into assembly 101, valve 118 may be closed. The motor/generator 102, employing energy supplied by a source not explicitly depicted in FIG. 1 (e.g., the electrical grid), then provides mechanical power to expansion/compression assembly 101, enabling the gas within assembly 101 to be compressed.

During compression of the gas within assembly 101, fluid (i.e., gas, liquid, or a gas-liquid mixture) may be circulated between assembly 101 and heat-exchange assembly 104. Heat-exchange assembly 104 may be operated in such a manner as to enable substantially isothermal compression of the gas within assembly 101. During or after compression of the gas within assembly 101, valve 108 may be opened to enable high-pressure fluid (e.g., compressed gas or a mixture of liquid and compressed gas) to flow to reservoir 112. Heat-exchange assembly 114 may be operated at any time in such a manner as alter the temperature and/or pressure of the fluid within reservoir 112.

That system 100 may also be operated so as to expand compressed gas from reservoir 112 in expansion/compression assembly 101 in such a manner as to deliver energy to the motor/generator 102 will be apparent to all persons familiar with the operation of pneumatic, hydraulic, and electric machines.

Figure 2:
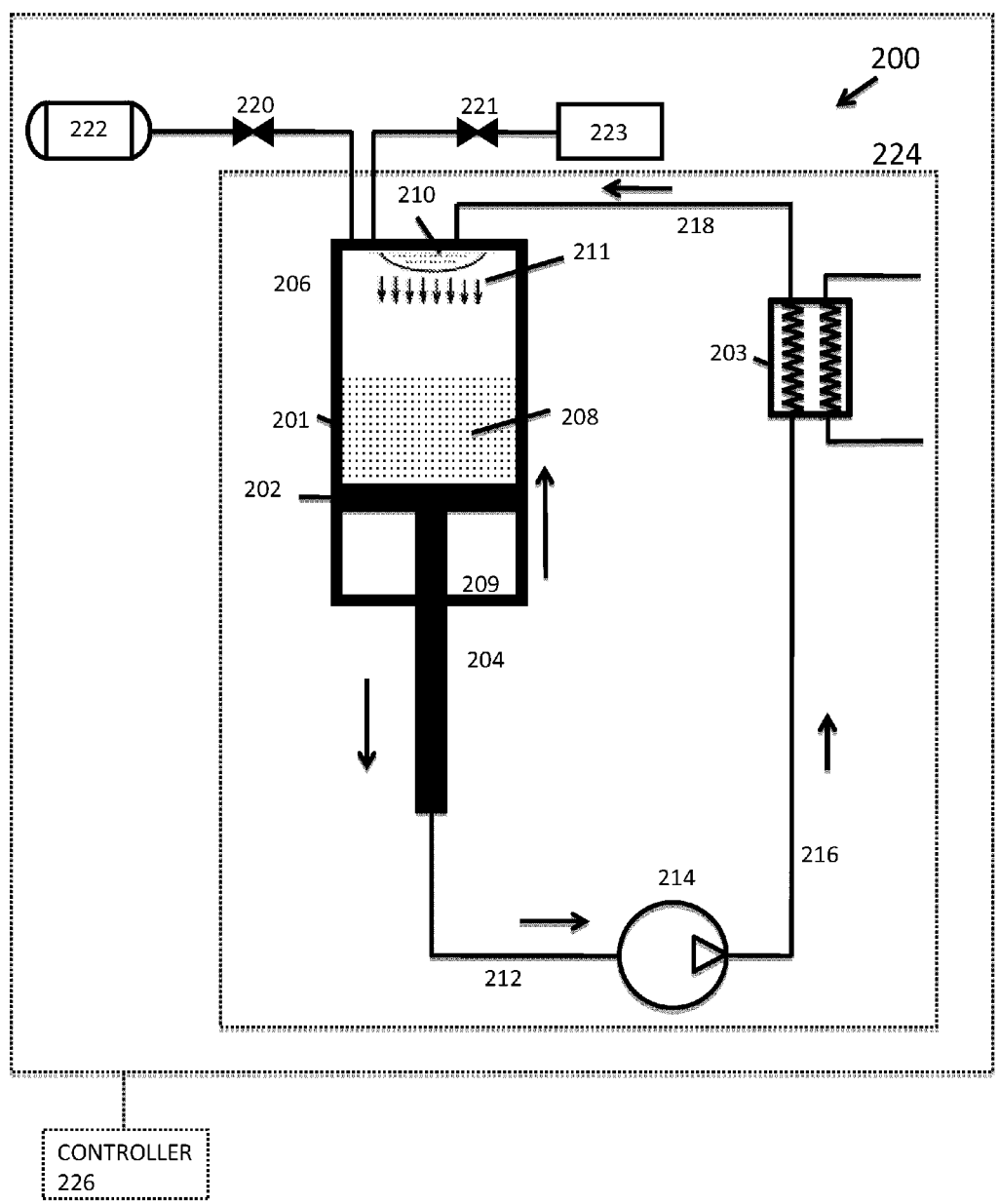
FIG. 2 is a schematic drawing of various components of a compressed-gas energy storage system in accordance with various embodiments of the invention.

FIG. 2 depicts an illustrative system 200 that features a cylinder assembly 201 (i.e., an embodiment of assembly 101 in FIG. 1) in communication with a reservoir 222 (112 in FIG. 1) and a vent to atmosphere 223 (120 in FIG. 1). In the illustrative system 200 shown in FIG. 2, the cylinder assembly 201 contains a piston 202 slidably disposed therein with a center-drilled rod 204 defining a fluid passageway extending from the piston 202. In some embodiments the piston 202 is replaced by a different boundary mechanism dividing cylinder assembly 201 into multiple chambers, or piston 202 is absent entirely, and cylinder assembly 201 is a "liquid piston." The cylinder assembly 201 may be divided into, e.g., two pneumatic chambers or one pneumatic chamber and one hydraulic chamber. The rod 204 is also attached to, e.g., a mechanical load (e.g., a crankshaft or a hydraulic system) that is not depicted. The cylinder assembly 201 is in liquid communication with a heat-transfer subsystem (104 in FIG. 1) that includes or consists essentially of a circulation pump 214, a spray mechanism 210, and a heat exchanger 203 to enable substantially isothermal compression/expansion of air. Spray mechanism 210 may include or consist essentially of one or more spray heads (e.g., disposed at one end of cylinder assembly 201) and/or spray rods (e.g., extending along at least a portion of the central axis of cylinder assembly 201). System 200 further includes a first control valve 220 (108 in FIG. 1) in communication with a storage reservoir 222 and cylinder assembly 201, and a second control valve 221 (118 in FIG. 1) in communication with a vent 223 and cylinder assembly 201. A control system 226 (122 in FIG. 1) may control operation of, e.g., valves 222 and 221 based on various system inputs (e.g., pressure, temperature, piston position, and/or fluid state) from cylinder assembly 201 and/or storage reservoir 222.

In an initial state, the cylinder assembly 201 may contain a gas 206 (e.g., air introduced to the cylinder assembly 201 via valve 221 and vent 223) and a heat-transfer fluid 208 (which may include or consist essentially of, e.g., water or another suitable liquid). When the gas 206 enters the cylinder assembly 201, piston 202 is operated to compress the gas 206 to an elevated pressure (e.g., 3,000 psi). The heat-transfer fluid 208 flows through the center-drilled rod 204 and through a pipe 212 to the pump 214 (any fluid 209 on the other side of the piston 202 may flow through other valves and pipes that are not shown). The pump 214 may raise the pressure of the heat-exchange fluid 208 to a pressure (e.g., up to approximately 3,015 psig) somewhat higher than the pressure within the cylinder assembly 201, as described in U.S. patent application Ser. No. 13/009,409, filed Jan. 19, 2011 (the '409 application), the entire disclosure of which is incorporated by reference herein. Alternatively or in conjunction, embodiments of the invention add heat (i.e., thermal energy) to, or remove heat from, the high-pressure gas in the cylinder assembly 201 by passing only relatively low-pressure fluids through a heat exchanger or fluid reservoir, as detailed in U.S. patent application Ser. No. 13/211,440, filed Aug. 17, 2011 (the '440 application), the entire disclosure of which is incorporated by reference herein.

The heat-transfer fluid 208 is then sent through a pipe 216 to the heat exchanger 203, where its temperature is altered, and then through a pipe 218 to the spray mechanism 210 disposed within the cylinder assembly 201. Heat-transfer spray 211 from spray mechanism 210 is admitted into cylinder assembly 201 to enable substantially isothermal compression of gas 206. In some embodiments, the heat exchanger 203 is configured to condition heat-transfer fluid 208 at low pressure (e.g., a pressure lower than the maximum pressure of a compression or expansion stroke in cylinder assembly 201), and heat-transfer fluid 208 is thermally conditioned between strokes or only during portions of strokes, as detailed in U.S. patent application Ser. No. 13/211,440, filed Aug. 17, 2011 (the '440 application), the entire disclosure of which is incorporated by reference herein. Embodiments of the invention are configured for circulation of heat-transfer fluid without the use of hoses that flex during operation through the use of, e.g., tubes or straws configured for non-flexure and/or pumps (e.g., submersible bore pumps, axial flow pumps, or other in-line style pumps) internal to the cylinder assembly (e.g., at least partially disposed within the piston rod thereof), as described in U.S. patent application Ser. No. 13/234,239, filed Sep. 16, 2011 (the '239 application), the entire disclosure of which is incorporated by reference herein.

At or near the end of the compression stroke, control system 226 opens valve 220 to admit the compressed gas 206 to the storage reservoir 222. Operation of valves 220 and 221 may be controlled by various inputs to control system 226, such as piston position in cylinder assembly 201, pressure in storage vessel 222, pressure in cylinder assembly 201, and/or temperature in cylinder assembly 201.

As mentioned above, the control system 226 may enforce substantially isothermal operation, i.e., expansion and/or compression of gas in cylinder assembly 201, via control over, e.g., the introduction of gas into and the exhausting of gas out of cylinder assembly 201, the rates of compression and/or expansion, and/or the operation of the heat-exchange subsystem in response to sensed conditions. For example, control system 226 may be responsive to one or more sensors disposed in or on cylinder assembly 201 for measuring the temperature of the gas and/or the heat-exchange fluid within cylinder assembly 201, responding to deviations in temperature by issuing control signals that operate one or more of the system components noted above to compensate, in real time, for the sensed temperature deviations. For example, in response to a temperature increase within cylinder assembly 201, control system 226 may issue commands to increase the flow rate of spray 211 of heat-exchange fluid 208.

Furthermore, embodiments of the invention may be applied to systems in which cylinder assembly 201 (or a chamber thereof) is in fluid communication with a pneumatic chamber of a second cylinder. That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 203 may be filled with water, a coolant mixture, and/or any acceptable heat-exchange medium. In alternative embodiments, a gas, such as air or refrigerant, is used as the heat-exchange medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 238 and fluid outlet 240 of the external heat exchange side of the heat exchanger 203 to an installation (not shown) such as a heat-engine power plant, an industrial process with waste heat, a heat pump, and/or a building needing space heating or cooling, as described in the '731 patent. The installation may be a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-exchange fluid to acquire or expel heat from/to the linked process, depending on configuration, for later use as a heating/cooling medium in the energy storage/conversion system.

Figure 3:
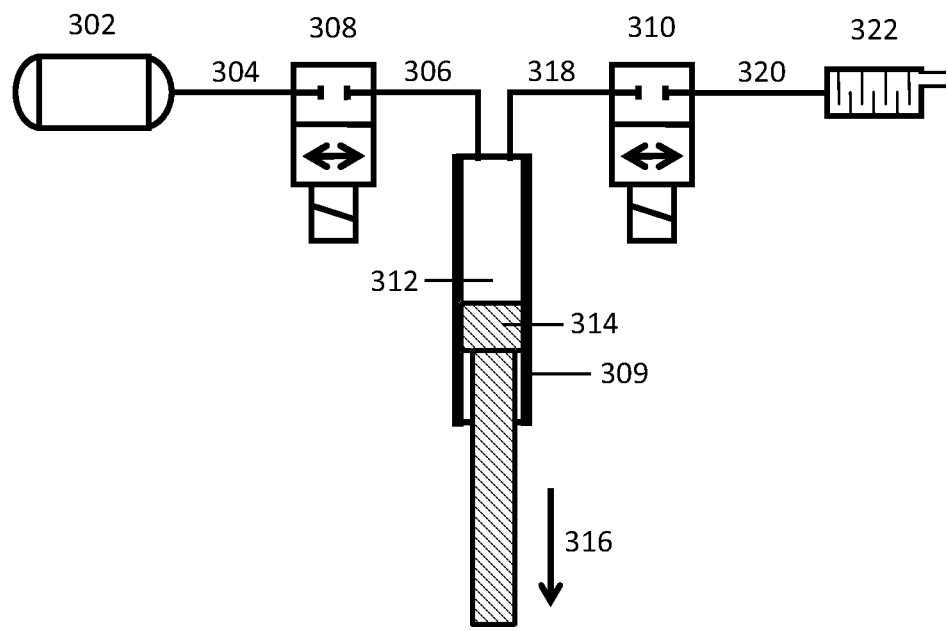
FIG. 3 is a schematic drawing of various components of a conventional compressed-gas energy storage system.

FIG. 3 is a schematic cross-sectional drawing of the major components of a more conventional pneumatic cylinder assembly. In one mode of operation, gas from a high-pressure store 302 is conducted through piping 304 to an open bidirectional valve 308 and then through additional piping 306 to a pneumatic or pneumatic-hydraulic cylinder assembly 309. Valve 310 is closed. The gas enters a chamber 312 of the cylinder 309. Within the chamber 312, the gas expands, performing work on a piston 314 while moving it in the direction indicated by arrow 316. Piston 314 may be connected to some mechanical load (not shown). After some degree of expansion of the gas in chamber 312, valve 308 is closed and valve 310 is opened. Gas is then evacuated from the chamber 312 through piping 318, valve 310, and additional piping 320 to a vent 322.

The valves 308, 310 may be actuated by mechanical, hydraulic, or electrical mechanisms. In other embodiments, either or both of the bidirectional valves 308 and 310 may be replaced by two one-directional valves in parallel, such as an actuated one-directional valve for expansion and a non-actuated check valve for compression, or by some other mechanism. Either the bidirectional valves depicted in FIG. 3 or other arrangements of valves may require piping (e.g., piping 306, 318) to connect the cylinder 309 to the valves (e.g., valves 308, 310). Such designs may entail valve arrangements that do not fail shut (e.g., that prevent the unwanted venting of high-pressure gas when power to valve actuation mechanisms fails), that contain dead space in piping, and that have other disadvantages.

Figure 4A:
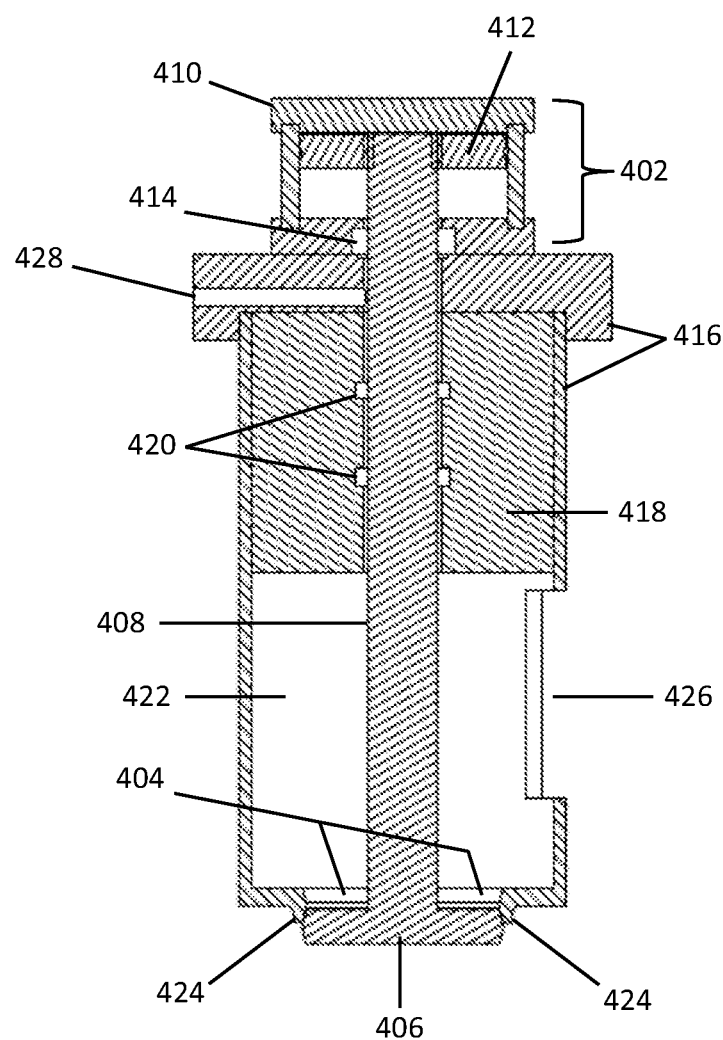
FIG. 4A is a schematic drawing of the major components of a low-side poppet valve in accordance with various embodiments of the invention.

FIG. 4A is a schematic cross-sectional drawing of the major components of an illustrative poppet valve 400, in accordance with various embodiments of the present invention, that employs a hydraulic actuation mechanism 402 to open and close a port (or opening) 404 by moving a disc (or valve member) 406 connected to a stem (or rod) 408. In other embodiments, the valve 400 is actuated by electrical and/or mechanical actuation systems. The valve may include a mechanical or pneumatic spring (not shown) to bias the valve towards closing, cushion opening forces, and/or replace or supplement the closing actuation mechanism. The valve 400 shown in FIG. 4A is a low-side valve, as defined above.

As depicted in FIG. 4A, the actuation mechanism 402 features a hydraulic cylinder 410 containing a piston 412. The piston 412 is connected to stem 408 that passes out of the actuation mechanism 402 through a gasket 414, passes into the body 416 of the valve 400, and passes through a ring 418 and additional gaskets 420. Exiting the ring 418, the stem 408 passes into a flow chamber 422 and through port 404. The stem 408 is connected to disc 406. The port 404 is surrounded by a lip or flange 424 termed the "seat." The seat is shaped and sized so that the entire periphery of the disc 406 may make tight contact with the surface of the seat 424. A second port 426 is typically permanently open and may be connected to piping (not shown). The stem 408, piston 412, disc 406, port 404, and seat 424 may be circular in cross-section or may have some other cross-sectional form.

As depicted in FIG. 4A, the low-side valve 400 is closed. That is, the stem 408, actuator piston 412, and disc 406 are in a position that places the disc 406 in firm contact with the seat 424, occluding the port 404. If greater force is exerted by fluid on the outside of the disc 406 than by fluid within the flow chamber 422, the valve will remain closed even if no force is applied to the stem 408 by the actuation mechanism 402. (The disc 406 is too large to pass through the port 404.) A drain 428 is provided for fluid leakage that may occur from the actuation mechanism 402 through gasket 414 or from chamber 422 through gasket 420.

The valve 400 may be designed to open at a predetermined pressure differential determined by the area ratios on either side of disc 406. The valve 400 may be responsive to a control system (e.g., control system 122 or control system 226) that actuates the valve at a time just prior to the valve checking open due to the predetermined pressure differential such that the pressure drop across the valve 400 stays below a threshold value (e.g. <2% of the absolute pressure), improving the efficiency of the energy storage system. Further, the actuation of the valve 400 may be such as to bias the valve towards opening or closing, and the actual hydraulic actuation may need not occur at the precise time of valve opening or closing. The control system may operate on a feedback loop that adjusts valve timing based on pressure drop across the valve 400 on a previous valve opening or closing occurrence or based on another feedback measurement such as actuation time of a previous occurrence. A pneumatic spring (not shown) may be included in the valve 400 to further bias the valve 400 towards closing. The pressure within the pneumatic spring may be adjusted during operation of the system and may even be vented for part of a cylinder stroke in order to achieve optimal valve performance.

Figure 4B:
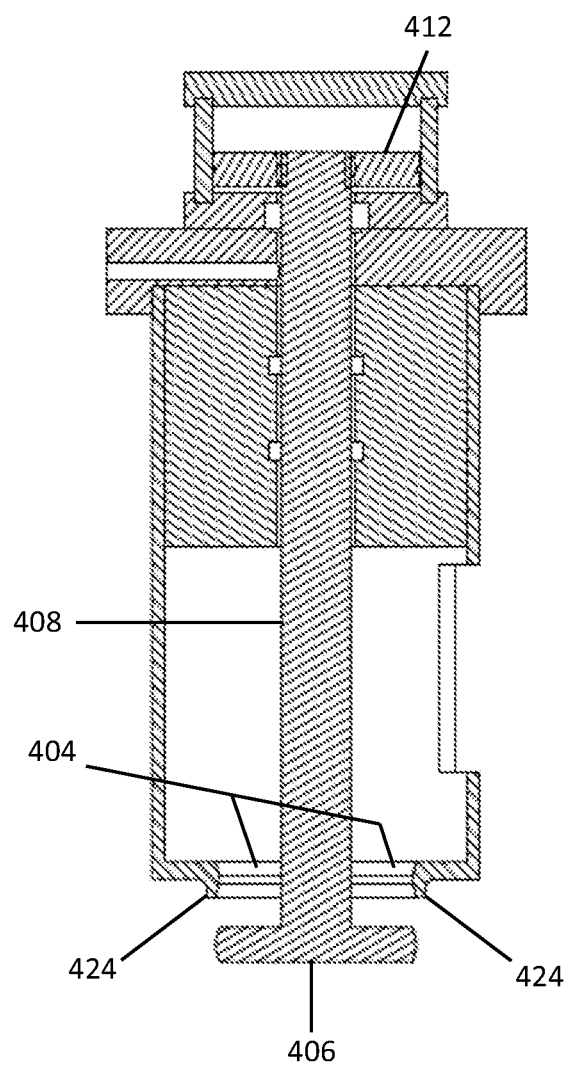
FIG. 4B is a schematic drawing of the valve of FIG. 4A in a different state of operation.

FIG. 4B depicts the high-side valve 400 in a fully open position. That is, the stem 408, actuator piston 412, and disc 406 are in a position that places the disc 406 as far out of contact with the seat 424 as the dimensions of the mechanism permit, opening the port 404.

Figure 5A:
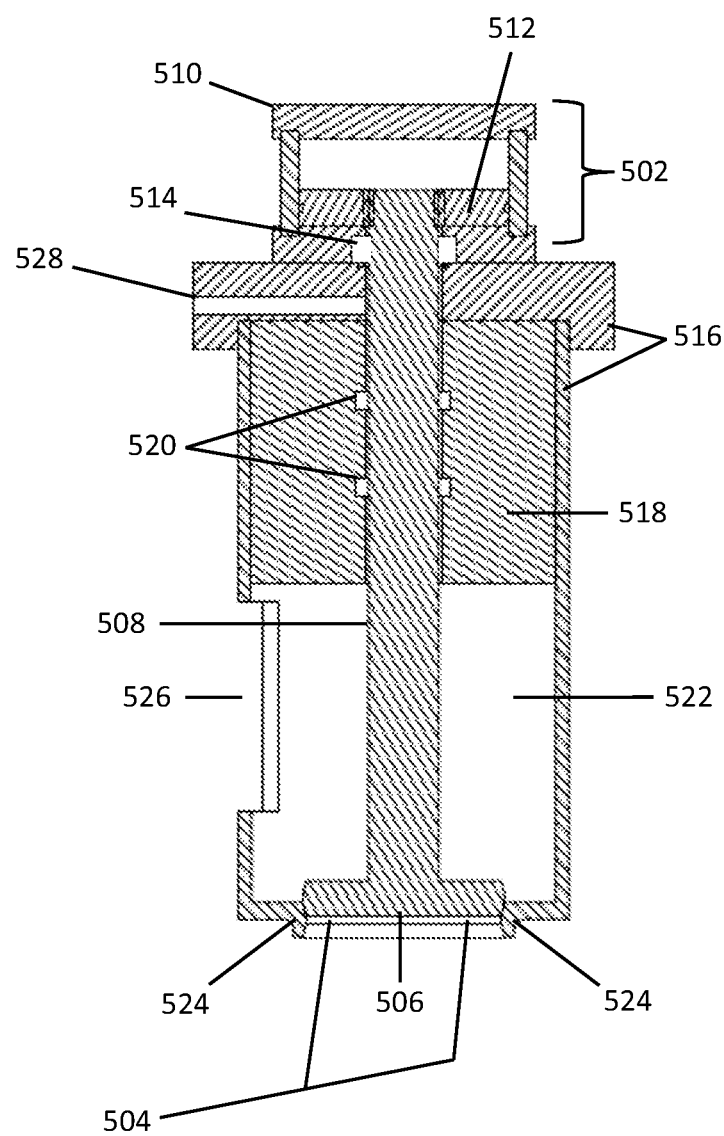
FIG. 5A is a schematic drawing of the major components of a high-side poppet valve in accordance with various embodiments of the invention.

FIG. 5A is a schematic cross-sectional drawing of the major components of an illustrative poppet valve 500, in accordance with various embodiments of the present invention, that employs a hydraulic actuation mechanism 502 to open and close a port 504 by moving a disc 506 connected to a stem 508. In other embodiments, the valve 500 is actuated by electrical and/or mechanical actuation systems. The valve 500 shown in FIG. 5A is a high-side valve, as defined above.

As depicted in FIG. 5A, the actuation mechanism 502 features a hydraulic cylinder 510 containing a piston 512. The piston 512 is connected to stem 508 that passes out of the actuation mechanism 502 through a gasket 514, passes into the body 516 of the valve 500, and passes through a ring 518 and additional gaskets 520. Exiting the ring 518, the stem 508 passes into a flow chamber 522 and through port 504. The stem 508 is connected to disc 506. The port 504 is surrounded by a lip or flange 524 termed the "seat." The seat is shaped and sized so that the entire periphery of the disc 506 may make tight contact with the surface of the seat 524. A second port 526 is typically permanently open and may be connected to piping (not shown). The stem 508, piston 512, disc 506, port 504, and seat 524 may be circular in cross-section or may have some other cross-sectional form.

As depicted in FIG. 5A, the high-side valve 500 is closed. That is, the stem 508, actuator piston 512, and disc 506 are in a position that places the disc 506 in firm contact with the seat 524, occluding the port 504. If less force is exerted by fluid on the outside of the disc 506 than by fluid within the flow chamber 522, the valve will remain closed even if no force is applied to the stem 508 by the actuation mechanism 502. (The disc 506 is too large to pass through the port 504.) A drain 528 is provided for fluid leakage that may occur from the actuation mechanism 502 through gasket 514 or from the chamber 522 through gasket 520.

The valve 500 may be designed to open at a predetermined pressure differential determined by the area ratios on either side of disc 506. The valve 500 may be responsive to a control system (e.g., control system 122 or control system 226) that actuates the valve at a time just prior to the valve checking open due to the predetermined pressure differential such that the pressure drop across the valve 500 stays below a threshold value (e.g. <2% of the absolute pressure), improving the efficiency of the energy storage system. Further, the actuation of the valve 500 may be such as to bias the valve towards opening or closing, and the actual hydraulic actuation may need not occur at the precise time of valve opening or closing. The control system may operate on a feedback loop that adjusts valve timing based on pressure drop across the valve 500 on a previous valve opening or closing occurrence or based on another feedback measurement such as actuation time of a previous occurrence. A pneumatic spring (not shown) may be included in the valve 500 to further bias the valve 500 towards closing. The pressure within the pneumatic spring may be adjusted during operation of the system and may even be vented for part of a cylinder stroke in order to achieve optimal valve performance.

Figure 5B:
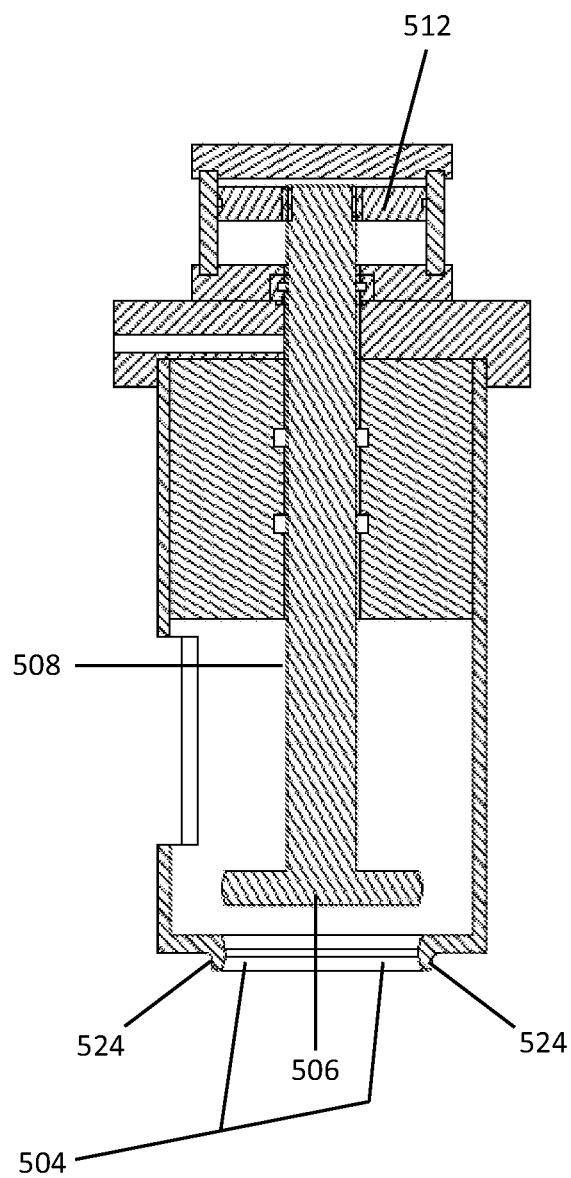
FIG. 5B is a schematic drawing of the valve of FIG. 5A in a different state of operation.

FIG. 5B depicts the high-side valve 500 in a fully open position. That is, the stem 508, actuator piston 512, and disc 506 are in a position that places the disc 506 as far out of contact with the seat 524 as the dimensions of the mechanism permit, opening the port 504.

Figure 6A:
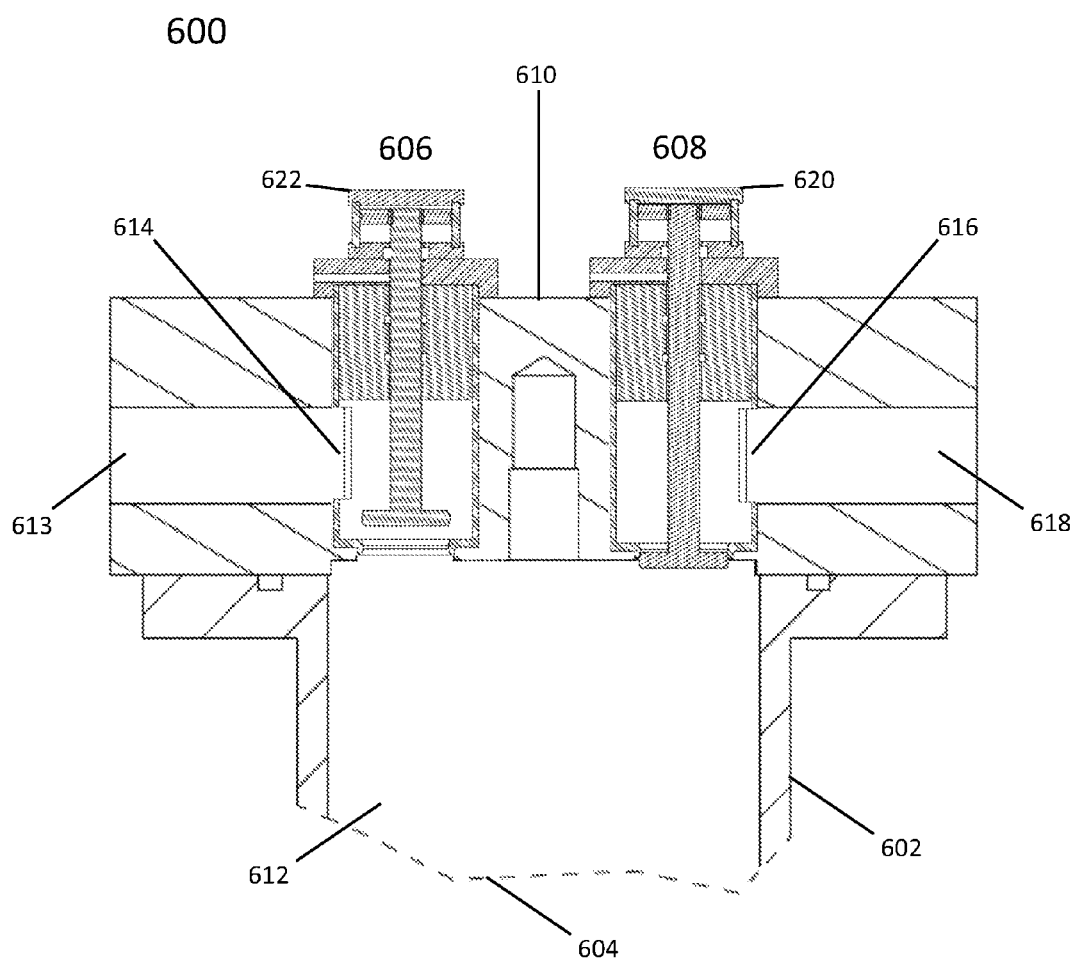
FIG. 6A is a schematic drawing of a cylinder assembly with a high-side valve and a low-side valve integrated into the head of the cylinder in accordance with various embodiments of the invention.

FIG. 6A is a schematic cross-sectional drawing of several components of a cylinder assembly 600 in accordance with various embodiments of the invention. FIG. 6A depicts one end of a pneumatic or pneumatic-hydraulic cylinder 602. Portions of the cylinder 602 and cylinder assembly 600 are not depicted in FIG. 6A, as indicated by the irregular dashed line 604. A high-side valve 606 and a low-side valve 608 are integrated with the head 610 (end cap) of the cylinder 602. That is, the valves 606, 608 are in this embodiment not connected to a chamber 612 within the cylinder 602 by piping, but communicate directly with the chamber 612. High-side valve 606 is substantially identical to the valve depicted in FIG. 5A and FIG. 5B. Low-side valve 608 is substantially identical to the valve depicted in FIG. 4A and FIG. 4B. The valves may be sized in a manner to allow low pressure drop (e.g., <2% of absolute pressure) when passing two-phase flow (i.e., both gas and liquid) including a substantial volume fraction of liquid (e.g., >20% of the total volume is liquid). The mass of the valves and actuation forces may be sized such that actuation time is rapid with respect to cylinder stroke time (e.g., <5% of total stroke time).

As depicted in FIG. 6A, a port 614 of high-side valve 606 communicates with a channel 613 within the cylinder head 610. The channel 613 may in turn be connected with piping that places channel 613 in fluid communication with a store of gas at high pressure (e.g., 3,000 psi). Port 616 of low-side valve 608 communicates with a channel 618 within the cylinder head 610. The channel 618 may in turn be connected with piping that places channel 618 in communication with a vent to the atmosphere (not shown), with a store of pressurized gas (not shown), or with the inlet of another pneumatic or pneumatic-hydraulic cylinder (not shown).

In the state of operation depicted in FIG. 6A, high-side valve 606 is open to admit gas from a high-pressure store (not shown) into chamber 612 of the cylinder 602. Low-side valve 608 is closed, and, barring the application of sufficient force by the actuation mechanism 620 of the valve 608, will remain closed by the pressure within the chamber 612, which is high relative to the pressure within the channel 618.

In a state of operation (not shown) subsequent to the state depicted in FIG. 6A, valves 606 and 608 are both closed. In this state, gas within the chamber 612 may be expanded, performing work on a piston (not shown) within the cylinder 602. Valve 606 may be configured so that if for any reason pressure of the fluid in chamber 612 exceeds that of the gas in the high-pressure store by some predetermined amount, valve 606 opens, acting as a pressure-relief to prevent overpressurization of the cylinder 602.

Figure 6B:
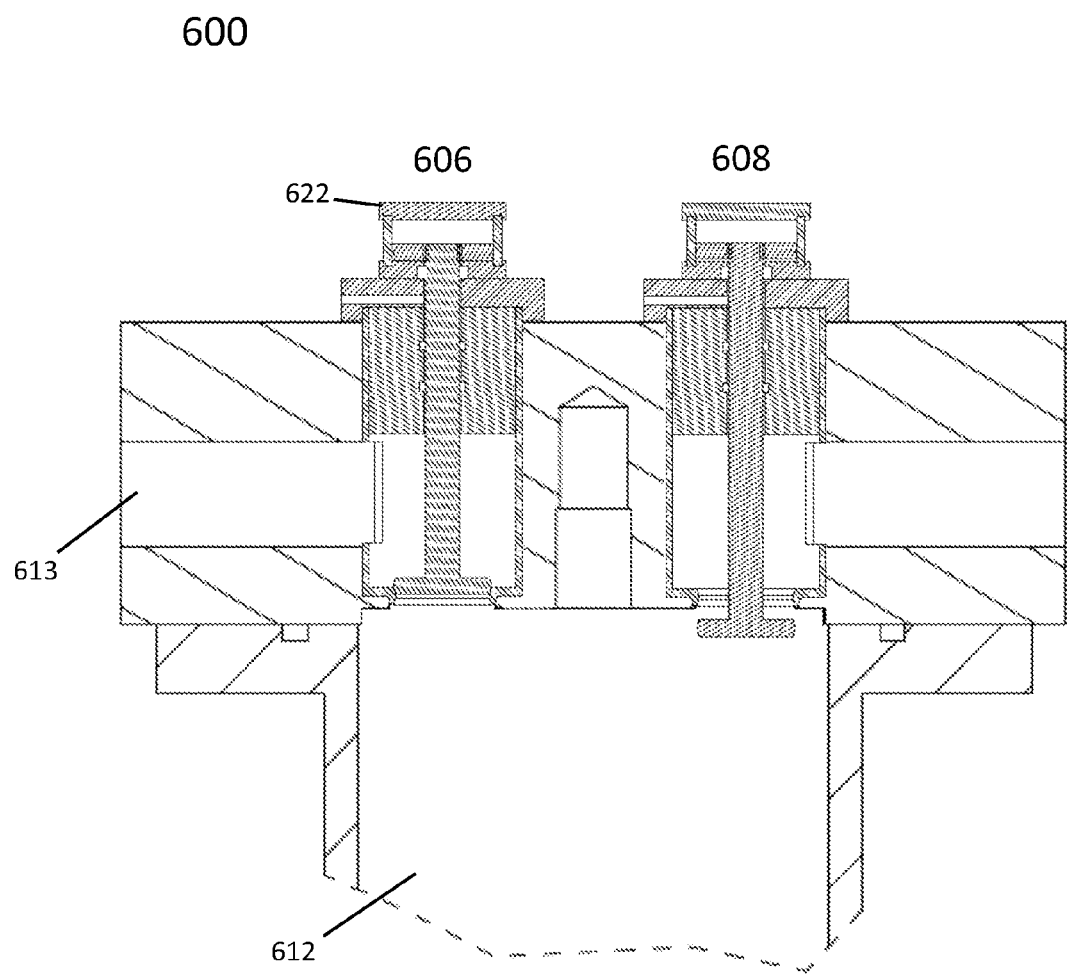
FIG. 6B is a schematic drawing of the system of FIG. 6A in a different state of operation.

FIG. 6B depicts the cylinder assembly of FIG. 6A in another state of operation. In the state of operation depicted in FIG. 6B, high-side valve 606 is closed and, barring the application of sufficient force by the actuation mechanism 622 of the valve 606, will be kept closed by the pressure within the channel 613, which is high relative to the pressure within the chamber 612. Low-side valve 608 is open to allow transfer (e.g., venting) of gas from chamber 612. When sufficient gas is transferred from chamber 612 in this state of operation, the cylinder assembly 600 may be returned to the state of operation depicted in FIG. 6A in order to admit another installment of high-pressure gas to chamber 612.

As described above and as depicted in FIG. 6C, the cylinder assembly 600 may be in selective communication, via channel 613 and piping 630, with another cylinder assembly 600' configured for expansion and/or compression of gas at a higher range of pressures. For example, gas may be expanded within cylinder assembly 600' from a high pressure (e.g., approximately the pressure of the high-pressure store) to an intermediate pressure, transferred to cylinder assembly 600 via channel 618', piping 630, and channel 613, and then expanded from the intermediate pressure to a lower pressure (e.g., approximately atmospheric pressure). Similarly, gas may be compressed within cylinder assembly 600 from a low pressure (e.g., approximately atmospheric pressure) to an intermediate pressure, transferred to cylinder assembly 600' via channel 613, piping 630, and channel 618', and then compressed from the intermediate pressure to a higher pressure (e.g., approximately the pressure of the high-pressure store).

As described above and as depicted in FIG. 6D, the cylinder assembly 600 may be in selective communication, via channel 618 and piping 640, with another cylinder assembly 600" configured for expansion and/or compression of gas at a lower range of pressures. For example, gas may be expanded within cylinder assembly 600 from a high pressure (e.g., approximately the pressure of the high-pressure store) to an intermediate pressure, transferred to cylinder assembly 600" via channel 618, piping 640, and channel 613", and then expanded from the intermediate pressure to a lower pressure (e.g., approximately atmospheric pressure). Similarly, gas may be compressed within cylinder assembly 600" from a low pressure (e.g., approximately atmospheric pressure) to an intermediate pressure, transferred to cylinder assembly 600 via channel 613", piping 640, and channel 618, and then compressed from the intermediate pressure to a higher pressure (e.g., approximately the pressure of the high-pressure store).

Figure 7:
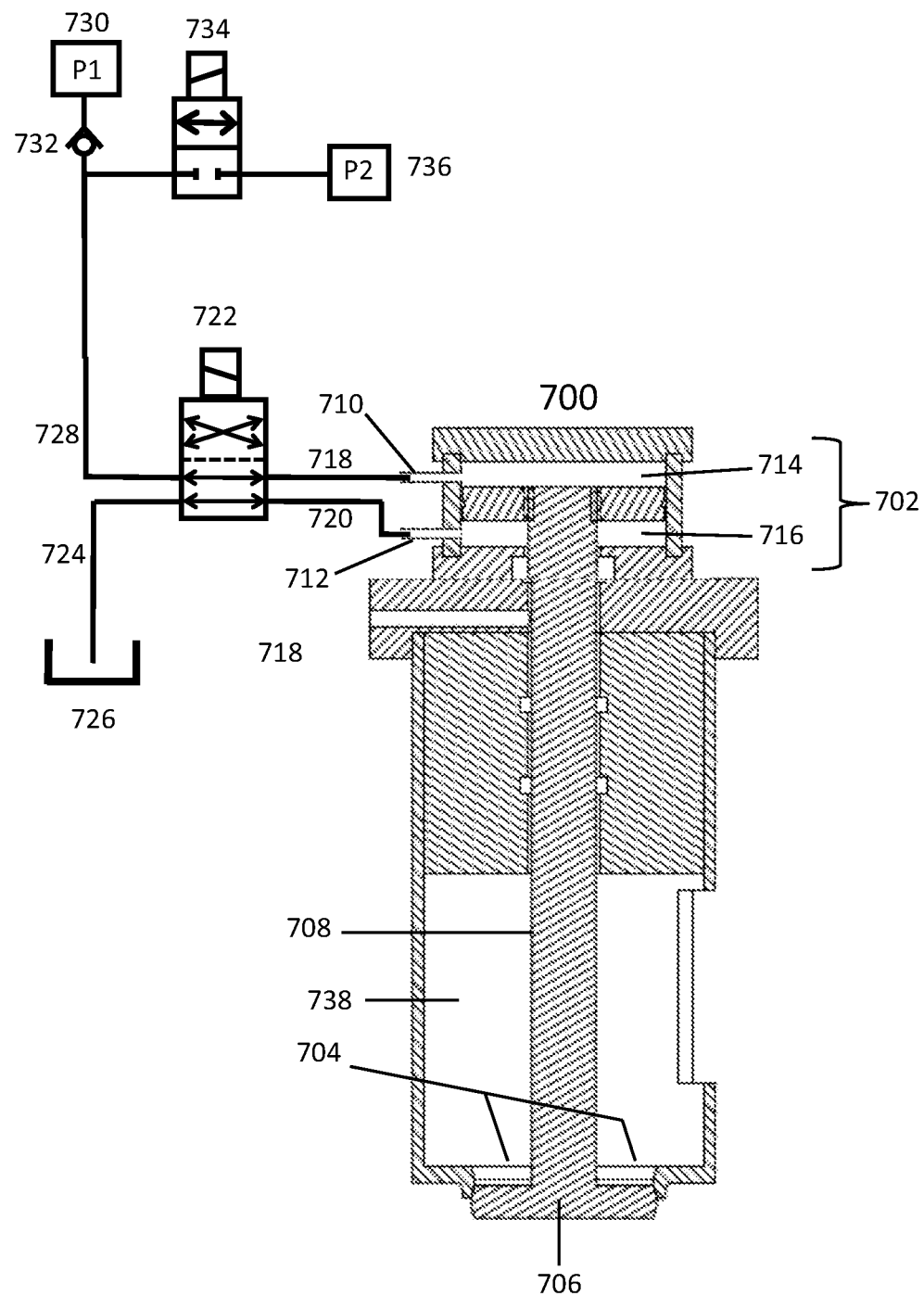
FIG. 7 is a schematic drawing of the major components of a low-side poppet valve with additional associated valves in accordance with various embodiments of the invention.

FIG. 7 is a schematic cross-sectional drawing of an illustrative poppet valve 700, in accordance with various embodiments of the present invention, that employs a hydraulic actuation mechanism 702 to open and close a port 704 by moving a disc 706 connected to a stem 708. In other embodiments, the valve 700 is actuated by electrical and/or mechanical actuation systems. The valve 700 shown in FIG. 7 is a low-side valve.

The valve 700 depicted in FIG. 7 is similar to the valve 400 depicted in FIG. 4A. However, FIG. 7 explicitly depicts arrangements, not shown in FIG. 4A, for introducing fluid into and removing fluid from the activation mechanism 702. As depicted in FIG. 7, the actuation mechanism 702 includes two channels 710, 712 that allow the interior chambers 714, 716 of the actuation mechanism 702 to communicate with piping 718, 720 and other components exterior to the actuation mechanism 702. Piping 718, 720 connects channels 710, 712 to a four-way valve 722. The valve 722 may be placed in either of two states: STATE 1, in which piping 718 (and thus channel 710) is in fluid communication with piping 728, and in which piping 720 (and thus channel 712) is in communication with piping 724, which communicates with a low-pressure tank 726, or STATE 2, in which piping 720 (and thus channel 712) is in fluid communication with piping 728, and in which piping 718 (and thus channel 710) is in communication with piping 724. (As utilized herein, a "tank" refers to a body of fluid, usually at low (e.g., atmospheric) pressure.) In STATE 1 of valve 722, the actuation mechanism 702 exerts a downward (valve-opening) force on the stem 708. In STATE 2 of valve 722, the actuation mechanism 702 exerts an upward (valve-closing) force on the stem 708.

Piping 728 communicates with a source or reservoir of high-pressure fluid 730, at a pressure P1, through a check valve 732. It also communicates with a source or reservoir of high-pressure fluid 736, at a pressure P2, through a two-way valve 734. Pressure P2 is substantially (e.g., by a factor of 10, or even more) higher than pressure P1. For example, if P1 is 300 psi, P2 may be 3,000 psi. If valve 734 is open, piping 728 is in communication with source P2 and the check valve 732 is closed because P2 is much greater than P1; if valve 734 is closed, the check valve 732 may open, placing piping 728 in communication with source 730 at pressure P1.

As depicted in FIG. 7, the low-side valve 700 is closed. If greater force is exerted by fluid on the outside of the disc 706 than by fluid within the flow chamber 738—e.g., if the pressure in the flow chamber 738 is sufficiently lower than the pressure in a cylinder chamber (not shown) on the outside of the disc 706—then the valve 700 will remain closed even if no force is applied to the stem 708 by the actuation mechanism 702. Valve 700 may thus fail closed under conditions where greater force is exerted by fluid on the outside of the disc 706 than by fluid within the flow chamber 738.

As depicted in FIG. 7, valve 722 is set to STATE 1 and valve 734 is closed. Chamber 714 is thus connected to source 730 at pressure P1 and chamber 716 is connected to the low-pressure tank 726. In this state of operation, the actuation mechanism 702 is applying downward (opening) force on the stem 708. However, pressure P1 may be insufficient to open the valve 700 if, for example, the pressure in the flow chamber 738 is sufficiently lower than the pressure in a cylinder chamber (not shown) on the outside of the disc 706. In this case, the valve 700 will remain closed even if downward force is applied to the stem 708 by the actuation mechanism 702 as actuated by fluid at pressure P1. Under these conditions, it may nevertheless be possible to open valve 700 by opening valve 734 while keeping valve 722 in STATE 1. Pressure P2 will then drive the actuation mechanism 702, applying a greater downward force to the stem 708 than is applied when pressure P1 drives the actuation mechanism 702. If pressure P2 is sufficiently high, then valve 700 may be opened even when pressure P1 is inadequate to drive the actuation mechanism 702.

In the embodiment depicted in FIG. 7, valve 700 is openable under a wider range of pressure conditions than it would be if only the pressure P1 were available to drive the actuation mechanism 702. For example, if unusually high pressure develops within the cylinder chamber below the disc 706 and it is for some reason not feasible to retract the piston (not shown) within the cylinder chamber (to relieve the pressure), setting valve 722 to STATE 1 and opening valve 734 will, if pressure P2 is sufficiently high, cause the valve 700 to open. Thus, in some embodiments, pressure P2 is approximately equal to, or even greater than, the maximum pressure of operation (e.g., of gas expansion and/or compression) of the cylinder to which valve 700 is connected.

In an embodiment of the invention, an alternative approach to facilitating the openability of valve 700 under a wide range of operating conditions is the use of higher pressure P2 at all times to drive actuation mechanism 702 (e.g., valve 734 and source 736 may be omitted, and pressure P1 of source 730 may be increased to a higher level, e.g., P2). Such an approach may also, however, entail greater energy consumption for the actuation mechanism 702 under routine operation, with consequent lower efficiency for any energy storage and retrieval system of which the assembly depicted in FIG. 7 might be a part. The embodiment depicted in FIG. 7 has an advantage that it facilitates the openability of valve 700 under a wider range of operating conditions without entailing higher parasitic energy losses during normal operation.

As shown in FIG. 7, setting valve 722 to STATE 2 with valve 734 open has the effect of applying a large upward (closing) force to the stem 708. As will be apparent to any person reasonably familiar with the art of hydraulic devices, the embodiment depicted in FIG. 7, featuring a low-side poppet valve, may be adapted with only slight rearrangement to a high-side poppet valve.

Valve 722 may include additional states in which both chambers 714, 716 of the actuator 702 may be connected to low pressure in order for the valve 700 to be biased neither towards opening or closing. Valve 734 may include a selective connection to low pressure to provide a similar purpose.

Figure 8:
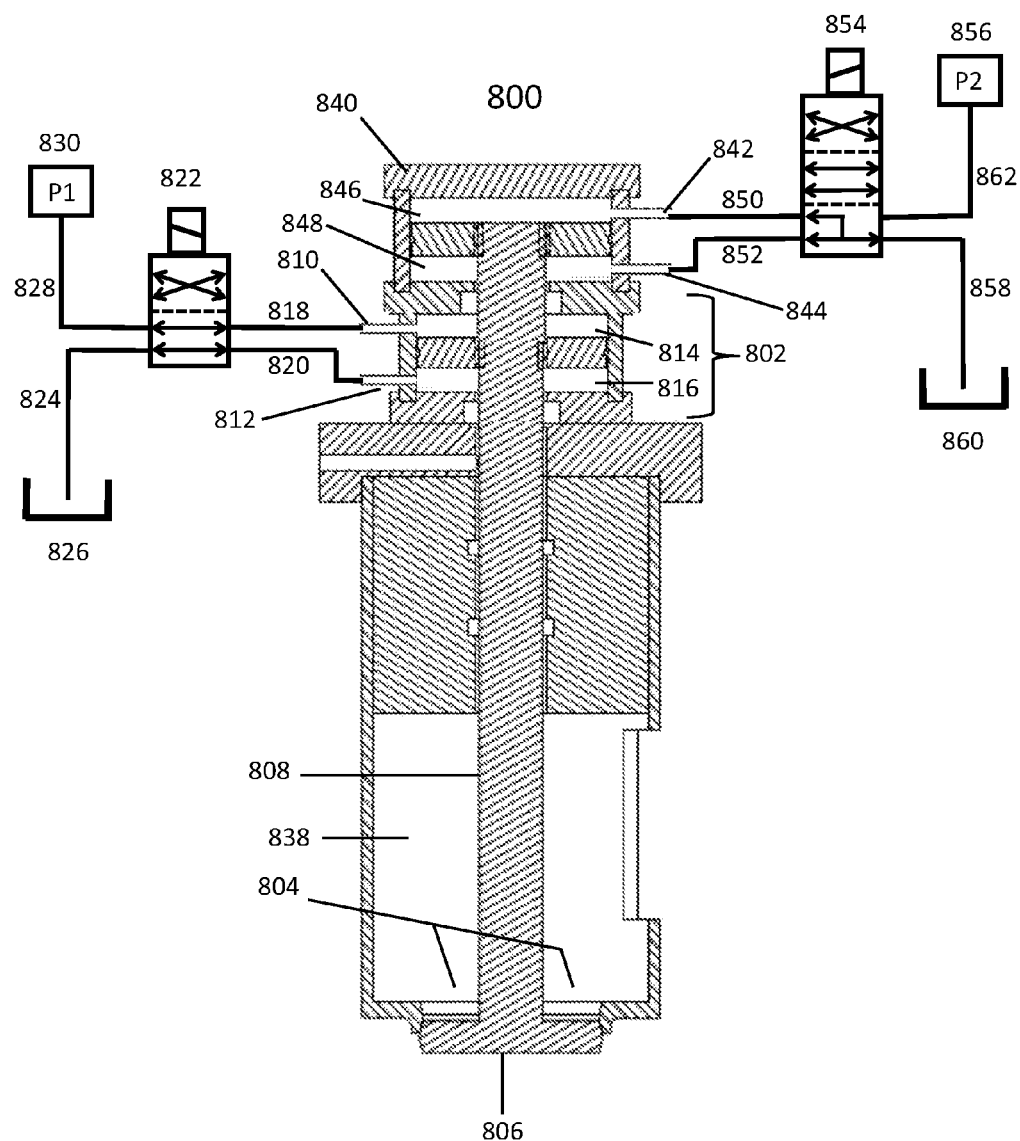
FIG. 8 is a schematic drawing of the major components of a low-side poppet valve with an additional actuation valve and additional associated valves in accordance with various embodiments of the invention.

FIG. 8 is a schematic cross-sectional drawing an illustrative low-side poppet valve 800, in accordance with various embodiments of the present invention, that employs two hydraulic actuation mechanisms 802, 840 to open and close a port 804 by moving a disc 806 connected to a stem 808. In other embodiments, the valve 800 is actuated by electrical and/or mechanical actuation systems. The valve 800 depicted in FIG. 8 is similar to the valve 700 depicted in FIG. 7, except that as depicted in FIG. 8, the low-side valve 800 includes a first hydraulic actuation mechanism 802, herein termed the "first actuator," and a second actuation mechanism 840, herein termed the "contingency actuator" or "second actuator." As depicted in FIG. 8, the first actuator is substantially identical to the actuation mechanism depicted in FIG. 7, except for its connection with the second actuator 840. Valve 822 may include additional states in which both chambers 814, 816 of the actuator 802 may be connected to low pressure in order for the valve 800 to be biased neither towards opening or closing.

The second actuator 840 features two channels 842, 844 that allow the interior chambers 846, 848 to communicate with piping 850, 852 and other components exterior to the second actuator 840. Piping 850, 852 connects channels 842, 844 to a four-way valve 854. The valve 854 may be placed in any of three states: STATE B1, in which piping 850 (and thus channel 842) is in fluid communication with piping 862, which communicates with a source of fluid 856 at pressure P2, and in which piping 852 (and thus channel 844) is in communication with piping 858, which communicates with a low-pressure tank 860; STATE B2, in which piping 852 (and thus channel 844) is in fluid communication with piping 862, which communicates with source of fluid 856 at pressure P2, and in which piping 850 (and thus channel 842) is in communication with piping 858, which communicates with low-pressure tank 860; or STATE B3, in which piping 850 and piping 852 are both placed in communication with piping 858, which communicates with the low-pressure tank 860.

In STATE B1 of the second actuator 840, the second actuator 840 exerts a downward (valve-opening) force on the stem 808. In STATE B2 of the second actuator 840, the second actuator 840 exerts an upward (valve-closing) force on the stem 808. In STATE B3, both chambers 846, 848 of the second actuator 840 are at (approximately equally) low pressure and may exchange fluid freely with each other and with the tank 860, and the second actuator thus does not contribute substantial resistance to movement of stem 808. As mentioned above, in preferred embodiments, pressure P2 is substantially higher than pressure P1. For example, if P1 is 300 psi, P2 may be 3,000 psi.

If greater force is exerted by fluid on the outside (nether side) of the disc 806 than by fluid within the flow chamber 838—e.g., if the pressure in the flow chamber 838 is sufficiently lower than the pressure in a cylinder chamber (not shown) on the outside of the disc 806—then the valve 800 will remain closed even if no significant force is applied to the stem 808 by the first actuator 802 (e.g., if the pressure P1 falls to a low value). Valve 800 may thus fail closed under conditions where greater force is exerted by fluid on the outside of the disc 806 than by fluid within the flow chamber 838.

As depicted in FIG. 8, the low-side valve 800 is closed, the first actuator is in STATE 1 as defined above with reference to FIG. 7, and the second actuator is in STATE B3. The tendency of this operating state is to open the valve 800, as the first actuator 802 is applying downward (opening) force on the stem 808 while the second actuator 840 is not applying any substantial force to the stem 808. However, pressure P1 may be insufficient to open the valve 800 if the pressure in the flow chamber 838 is sufficiently low and the pressure in the cylinder chamber (not shown) below disc 806 is sufficiently high. In this case the valve 800 will remain closed despite the opening force applied to the stem 808 by the first actuator 802. Under these conditions, it may be possible to open valve 800 by setting valve 854 to STATE B1 (and, preferably, keeping valve 822 in STATE 1). Pressure P2 will then drive the second actuator 840, applying a greater downward force to the stem 808 than may be applied by the first actuator 802 alone. If pressure P2 is sufficiently high, then this procedure will open valve 800 under conditions where the first actuator 802 may be incapable of doing so.

As shown in FIG. 8, setting valve 854 to STATE B2 has the effect of applying a large upward (closing) force to the stem 808. Although the first actuator 802 and second actuator 840 in FIG. 8 are depicted as approximately the same size, FIG. 8 is a schematic representation only. In practice, the first actuator 802 may differ in piston diameter and other aspects (e.g., size and/or shape) from the second actuator 840. It will be apparent to any person reasonably familiar with the art of hydraulic devices that the embodiment depicted in FIG. 8, featuring a low-side poppet valve, may be adapted with only slight rearrangement to a high-side poppet valve.

Figure 9:
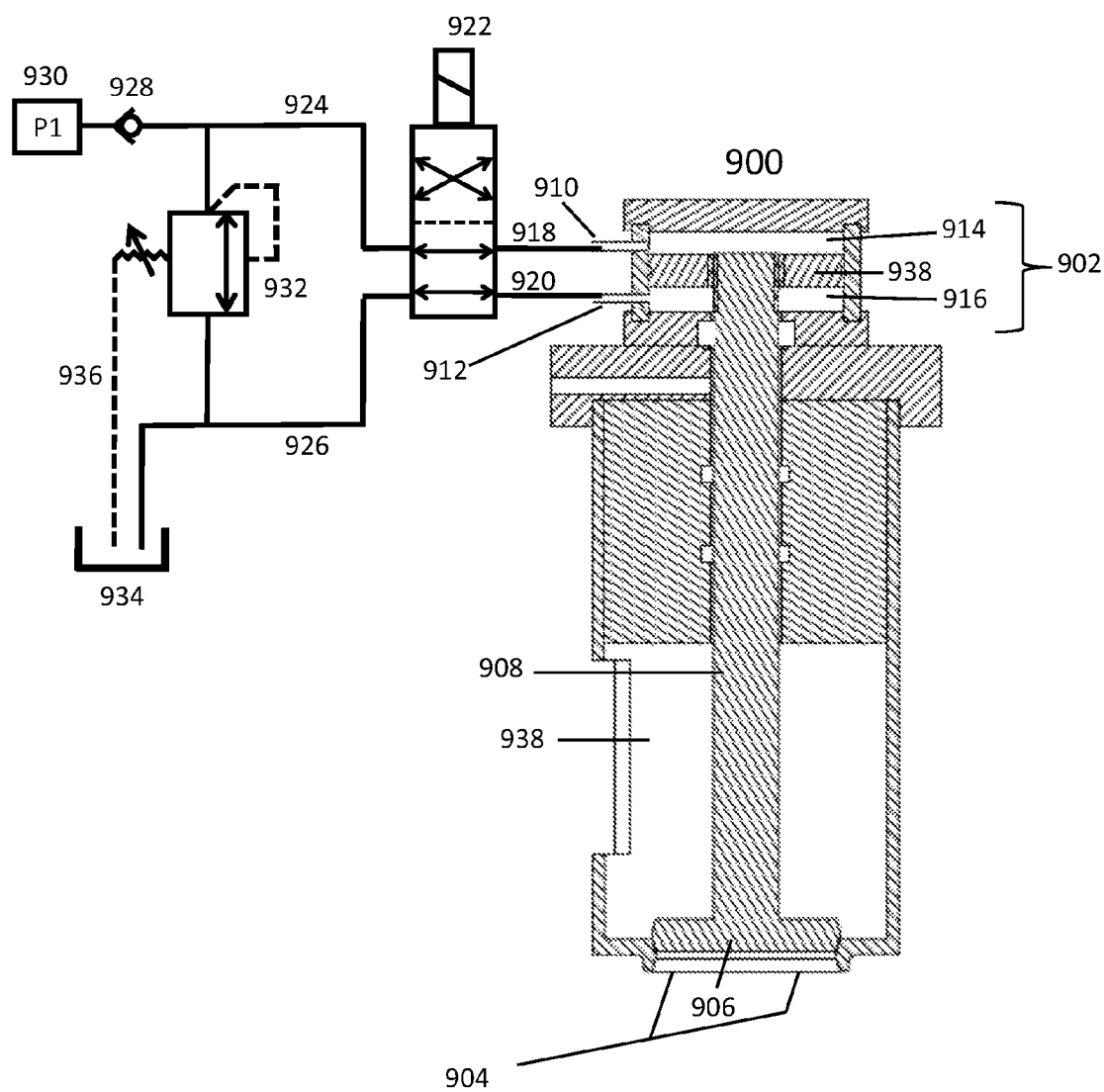
FIG. 9 is a schematic drawing of the major components of a high-side poppet valve with additional associated valves in accordance with various embodiments of the invention.

FIG. 9 is a schematic cross-sectional drawing of an illustrative poppet valve 900, in accordance with various embodiments of the present invention, that employs a hydraulic actuation mechanism 902 to open and close a port 904 by moving a disc 906 connected to a stem 908. In other embodiments, the valve 900 is actuated by electrical and/or mechanical actuation systems. The valve 900 shown in FIG. 9 is a high-side valve.

As depicted in FIG. 9, the actuation mechanism 902 features two channels 910, 912 that allow the interior chambers 914, 916 of the actuation mechanism 902 to communicate with piping 918, 920 and other components exterior to the actuation mechanism 902. Piping 918, 920 connects channels 910, 912 to a four-way valve 922. The valve 922 may be placed in either of two states: STATE 1, in which piping 918 (and thus channel 910) is in fluid communication with piping 924, and in which piping 920 (and thus channel 912) is in communication with piping 926, or STATE 2, in which piping 920 (and thus channel 912) is in fluid communication with piping 924, and in which piping 918 (and thus channel 910) is in communication with piping 926. Piping 924 communicates with a check valve 928 that in turn communicates with a source of pressurized fluid 930 at pressure P1. Piping 924 also communicates with the input port of a sequence valve 932. Piping 926 communicates with a low-pressure tank 934 and with the outlet port of the sequence valve 932.

In STATE 1 of valve 922, the actuation mechanism 902 exerts a downward (closing) force on the stem 908. In STATE 2 of valve 922, the actuation mechanism 902 exerts an upward (opening) force on the stem 908. In FIG. 9, valve 922 is depicted in STATE 1.

The operating states of the sequence valve 932 will be apparent to all persons reasonably familiar with the art of hydraulic machines. In brief, the operating state of valve 932 is determined by the pressure difference between its inlet and outlet ports. When that pressure difference exceeds a pre-set threshold, the valve 932 diverts flow from its inlet (connection with piping 924) to low-pressure tank 934 via piping 936. The valve 932 thus acts as an accurate pressure-limiting valve capable of diverting flow to a secondary circuit, which in this case is the low-pressure tank 934.

In the embodiment depicted in FIG. 9, the outside port 904 of poppet valve 900 is connected to a cylinder chamber (not shown). If fluid pressure in the cylinder chamber exceeds a certain value, it may be desired that the valve 900 open automatically to supply pressure relief, even though valve 922 is in STATE 1 and the actuation mechanism 902 is thus exerting a downward (closing) force on the stem 908. For example, an accumulation of liquid in the cylinder prior to a compression stroke might lead to a hydrolock condition and the occurrence of excessive pressure within the cylinder. Force applied to disc 906 by excessive pressure in the cylinder chamber will be transmitted by the stem 908 to the piston 938 of the actuation mechanism 902 and will thus pressurize the fluid within chamber 914 and components in communication therewith, perhaps to unacceptably high levels.

Automatic opening of the valve 900 under conditions of high cylinder pressure, with consequent relief of pressure in the cylinder, may be accomplished by setting the threshold pressure of the valve 932 to an appropriate level. If overpressure occurs in chamber 914 with valve 922 in STATE 1, sequence valve 932 will divert fluid from piping 924 to the tank 934 and the valve 900 will open, relieving the cylinder overpressure.

Valve 922 may include additional states in which both chambers 914, 916 of the actuator 902 may be connected to low pressure in order for the valve 900 to be biased neither towards opening or closing. As will be apparent to any person reasonably familiar with the art of hydraulic devices, the embodiment depicted in FIG. 9 may be combined with the embodiments of FIG. 7 and FIG. 8. That is, the pressure-relief or anti-hydrolock functionality of the embodiment depicted in FIG. 9 may be combined with either or both arrangements for directing increased force to the stem of the poppet valve (700 or 800) depicted in FIG. 7 and FIG. 8. Moreover, it will be apparent to any person reasonably familiar with the art of hydraulic devices that the embodiment depicted in FIG. 9, featuring a high-side poppet valve, as well as any combination of the embodiment depicted in FIG. 9 with the embodiments of FIG. 7 and FIG. 8, may be adapted with only slight rearrangement to a low-side poppet valve.

Figure 10:
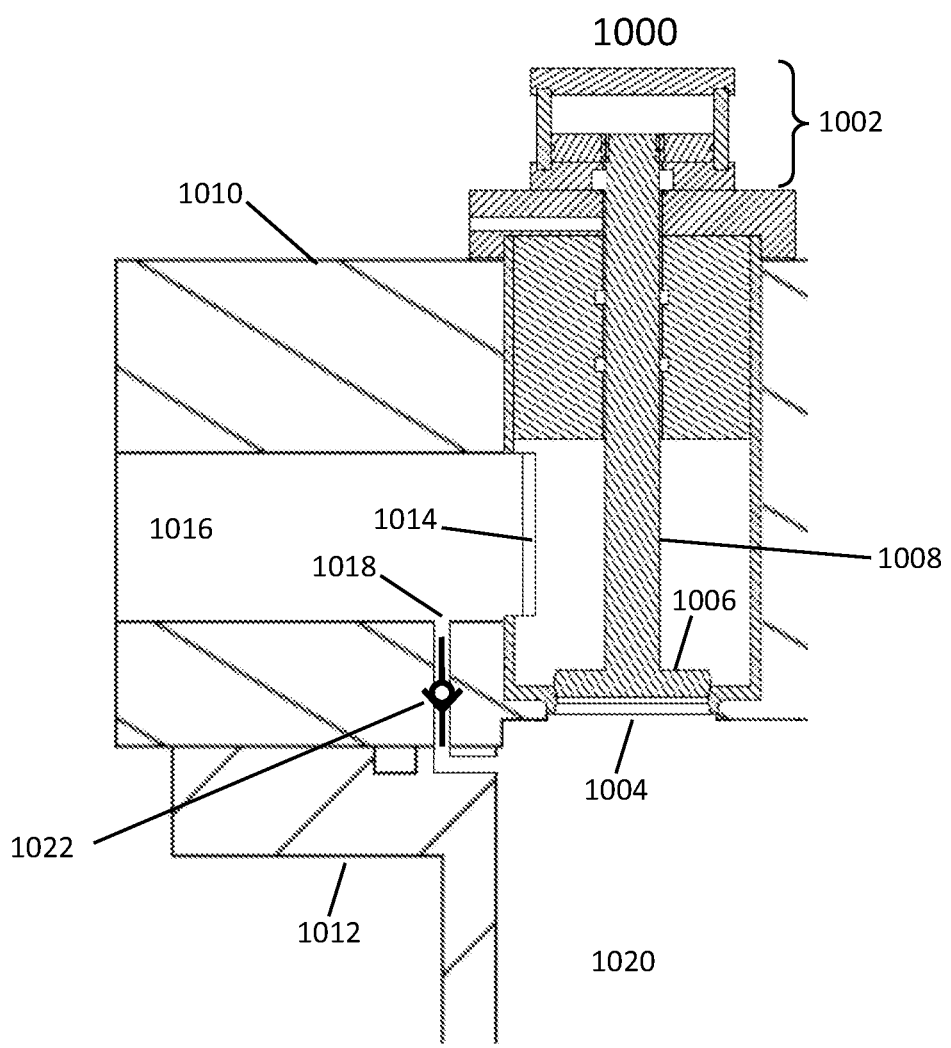
FIG. 10 is a schematic drawing of the major components of a high-side poppet valve, a portion of a cylinder, and other components in accordance with various embodiments of the invention.

FIG. 10 is a schematic cross-sectional drawing of an illustrative poppet valve 1000, in accordance with various embodiments of the present invention, that employs a hydraulic actuation mechanism 1002 to open and close a port 1004 by moving a disc 1006 connected to a stem 1008. In other embodiments, the valve 1000 is actuated by electrical and/or mechanical actuation systems. The valve 1000 shown in FIG. 10 is a high-side valve. The valve 1000 depicted in FIG. 10 is similar to the valve 500 depicted in FIG. 5A.

As depicted in FIG. 10, the valve 1000 is embedded or integrated within the upper end-cap or head 1010 of a vertically oriented cylinder 1012. Only a portion of cylinder 1012 and of its head 1010 are depicted in FIG. 10.

A gated port 1014 of valve 1000 communicates with a channel 1016 in the head 1010 of cylinder 1012. Channel 1016 communicates with a source or reservoir (not depicted) of gas at high pressure (e.g., 3,000 psi). A channel 1018 connects the channel 1016 with the upper chamber 1020 of the cylinder 1012. A check valve 1022 in channel 1018 prevents the passage of fluid from chamber 1020 to channel 1016 unless the pressure difference between chamber 1020 and channel 1016 exceeds the cracking pressure of the check valve 1022.

Excessive pressure might develop within the chamber 1020: for example, an accumulation of liquid in chamber 1020 during a compression stroke of cylinder 1012 might lead to a hydrolock condition with excessive pressure within the chamber 1020. As described for the embodiment depicted in FIG. 9, excessive pressure in the chamber 1020 may also lead to excessive pressure in the actuation mechanism 1002 and components in communication therewith (not depicted in FIG. 10).

In preferred embodiments of the invention, the check valve 1022 prevents the occurrence of excessive pressures within both chamber 1020 and the actuation mechanism 1002. The cracking or opening pressure of check valve 1022 may be selected as the maximum tolerable difference between the high-pressure gas in channel 1016 and fluid within the chamber 1020. If excessive pressure occurs in chamber 1020, fluid will flow therefrom into channel 1016 and the fluid reservoir (not shown) with which channel 1016 is connected, relieving the overpressure in chamber 1020.

As will be apparent to any person reasonably familiar with the art of hydraulic devices, the embodiment depicted in FIG. 10 may be combined with the embodiments of FIG. 7 and FIG. 8. That is, the pressure-relief or anti-hydrolock functionality of the embodiment depicted in FIG. 10 may be combined with either or both arrangements for directing increased force to the stem of the poppet valve (700 or 800) depicted in FIG. 7 and FIG. 8. Moreover, it will be apparent to any person reasonably familiar with the art of hydraulic devices that the embodiment depicted in FIG. 10, featuring a high-side poppet valve, as well as any combination of the embodiment depicted in FIG. 10 with the embodiments of FIG. 7 and FIG. 8, may be adapted with only slight rearrangement to a low-side poppet valve.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

Embodiments of the invention may, during operation, convert energy stored in the form of compressed gas and/or recovered from the expansion of compressed gas into gravitational potential energy, e.g., of a raised mass, as described in U.S. patent application No. 13/221,563, filed Aug. 30, 2011, the entire disclosure of which is incorporated herein by reference.

Systems in accordance with embodiments of the invention may utilize a substantially incompressible fluid and/or one or more pressurized reservoirs to minimize or eliminate dead space within one or more cylinder assemblies, as described in U.S. patent application Ser. Nos. 13/080,910 and 13/080,914, filed Apr. 6, 2011, the entire disclosure of each of which is incorporated herein by reference. As also described in these applications, embodiments of the invention may incorporate mechanisms for substantially preventing the flow of gas from the cylinder assembly into the heat-exchange components (e.g., heat exchangers, pumps, and/or pipes connected thereto and/or between the cylinder assembly and such components), and may thereby substantially prevent formation of dead space in the heat-exchange components. For example, various embodiments incorporate one or more check valves on the upstream side of one or more of the nozzles in the spray mechanism introducing heat-exchange fluid into a cylinder assembly.

In various embodiments of the invention, the heat-exchange fluid utilized to thermally condition gas within one or more cylinders incorporates one or more additives and/or solutes, as described in U.S. patent application Ser. No. 13/082,808, filed Apr. 8, 2011 (the '808 application), the entire disclosure of which is incorporated herein by reference. As described in the '808 application, the additives and/or solutes may reduce the surface tension of the heat-exchange fluid, reduce the solubility of gas into the heat-exchange fluid, and/or slow dissolution of gas into the heat-exchange fluid. They may also (i) retard or prevent corrosion, (ii) enhance lubricity, (iii) prevent formation of or kill microorganisms (such as bacteria), and/or (iv) include a defoaming agent, as desired for a particular system design or application.

Embodiments of the invention may also feature spray-mechanism designs described in U.S. patent application Ser. Nos. 13/105,986 and 13/105,988, filed May 12, 2011, the entire disclosure of each of which is incorporated herein by reference, e.g., spray mechanisms configured to fill substantially all of the volume of a cylinder with overlapping sprays of heat-exchange fluid. As also described in these applications, embodiments of the invention may control the number of nozzles of a spray mechanism actively spraying heat-exchange fluid based on, e.g., the pressure inside the cylinder assembly, rather than merely increasing a volumetric flow of heat-exchange fluid through the nozzles. Embodiments may utilize multiple groups of nozzles (of similar or different designs), more of which are utilized as the pressure within the cylinder assembly increases.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An energy storage and recovery system comprising:
   a cylinder assembly (i) for, therewithin, at least one of the compression of gas to store energy or the expansion of gas to recover energy and (ii) having an interior compartment and an end cap disposed at an end of the cylinder assembly;
   integrated within the end cap, (i) a first valve for admitting fluid into the interior compartment of the cylinder assembly prior to expansion and exhausting fluid from the interior compartment of the cylinder assembly after compression, and (ii) a second valve for exhausting fluid from the interior compartment of the cylinder assembly after expansion and admitting fluid into the interior compartment of the cylinder assembly prior to compression, each of the first and second valves comprising a gated port and an outside port, the first and second valves controlling fluid communication with the interior compartment via respective separate fluid paths;

a first actuation mechanism for actuating the first valve;

a second actuation mechanism for actuating the second valve; and a control system for controlling the first and second actuation mechanisms based on at least one of a pressure inside the interior compartment of the cylinder assembly, a position of the gated port of the first valve, or a position of the gated port of the second valve, the control system reducing a pressure differential through at least one of the first or second valves during fluid flow therethrough, thereby increasing efficiency of the energy storage and recovery, wherein:

the second actuation mechanism is configured for (i) applying a first actuation force against a first pressure differential between a pressure in the interior compartment and a pressure within the second valve between the gated port and the outside port and (ii) applying a second actuation force greater than the first actuation force against a second pressure differential, greater than the first pressure differential, between the pressure in the interior compartment and the pressure within the second valve between the gated port and the outside port, the cylinder assembly is configured to operate at the first pressure differential during the at least one of compression or expansion of gas, the second actuation mechanism is configured to apply the second actuation force only when the first actuation force is insufficient to open the second valve, and the second actuation mechanism comprises a hydraulic mechanism selectively connectable to (i) a first source of fluid at a pressure sufficient to provide an actuation force greater than the first actuation force and less than the second actuation force and (ii) a second source of fluid at a pressure greater than the pressure of the first source of fluid and sufficient to provide an actuation force greater than the second actuation force.

2. The system of claim 1, wherein the first valve is a high-side valve and the second valve is a low-side valve.

3. The system of claim 1, wherein the outside port of the first valve is in selective communication with a compressed-gas reservoir.

4. The system of claim 1, wherein the outside port of the first valve is in selective communication with a second cylinder assembly configured for at least one of expansion or compression of gas at a higher range of pressures than a pressure range of the expansion or compression within the interior compartment of the cylinder assembly.

5. The system of claim 1, wherein the outside port of the second valve is in selective communication with a vent to atmosphere.

6. The system of claim 1, wherein the outside port of the second valve is in selective communication with a second cylinder assembly configured for at least one of expansion or compression of gas at a lower range of pressures than a pressure range of the expansion or compression within the interior compartment of the cylinder assembly.

7. The system of claim 1, wherein each of the first and second actuation mechanisms is at least one of hydraulic, electrical, or mechanical.

8. The system of claim 1, wherein (i) each of the first and second valves comprises a disc that selectively closes the gated port, (ii) the gated port of the first valve is disposed between the disc of the first valve and the interior compartment, and (iii) the disc of the second valve is disposed between the gated port of the second valve and the interior compartment.

9. The system of claim 1, wherein the interior compartment is a pneumatic chamber, and further comprising a movable boundary mechanism disposed within the cylinder assembly and separating the interior compartment from a second interior compartment.

10. The system of claim 1, further comprising, disposed within the end cap, (i) a first channel forming at least a portion of the fluid path controlled by the first valve and (ii) a second channel, separate from the first channel, forming at least a portion of the fluid path controlled by the second valve.

11. The system of claim 1, further comprising a mechanism for introducing heat-exchange fluid into the interior compartment.

12. The system of claim 11, wherein the mechanism comprises at least one of a spray head or a spray rod.

13. The system of claim 11, wherein the first valve and the second valve are both configured for exhausting two-phase flow of gas and heat-exchange fluid from the interior compartment.

14. The system of claim 1, wherein each of the first and second valves is configured to check open, enabling fluid communication with the interior compartment of the cylinder assembly, in the absence of actuation force applied by its actuation mechanism.

15. The system of claim 1, wherein the second valve is configured to check open and enable fluid flow therethrough at a pressure differential less than approximately 20% of a pressure within the cylinder assembly during a hydrolock event, thereby preventing hydrolock damage to the cylinder assembly.

16. The system of claim 1, wherein the control system actuates open the second valve at a pressure (i) outside the interior compartment, (ii) acting on the second valve, and (iii) insufficient to check open the second valve, thereby reducing the pressure differential during fluid flow through the second valve.

17. The system of claim 1, wherein the control system actuates open the first valve at a pressure (i) within the interior compartment, (ii) acting on the first valve, and (iii) insufficient to check open the first valve, thereby reducing the pressure differential during fluid flow through the first valve.

18. The system of claim 1, further comprising, connected to the cylinder assembly, an intermittent renewable energy source of wind or solar energy, wherein (i) energy stored during compression of the gas originates from the intermittent renewable energy source, and (ii) energy is recovered via expansion of the gas when the intermittent renewable energy source is nonfunctional.

* * * * *